United States Patent
Wilkes

(10) Patent No.: US 8,630,951 B2
(45) Date of Patent: Jan. 14, 2014

(54) SYSTEMS AND METHODS FOR ELECTRONICALLY CIRCULATING A CURRENCY

(75) Inventor: Bradley Wilkes, Alpine, UT (US)

(73) Assignee: Capitalwill LLC, Alpine, UT (US)

( * ) Notice: Subject to any disclaimer, the term of this patent is extended or adjusted under 35 U.S.C. 154(b) by 59 days.

(21) Appl. No.: 12/645,079

(22) Filed: Dec. 22, 2009

(65) Prior Publication Data

US 2010/0306092 A1 Dec. 2, 2010

Related U.S. Application Data

(63) Continuation-in-part of application No. 12/472,249, filed on May 26, 2009.

(51) Int. Cl.
- *G06Q 40/00* (2012.01)
- *G07B 17/00* (2006.01)
- *G07F 19/00* (2006.01)

(52) U.S. Cl.
USPC .................................. 705/44; 705/30; 705/39

(58) Field of Classification Search
USPC ............................................... 705/30, 39, 44
See application file for complete search history.

(56) References Cited

U.S. PATENT DOCUMENTS

| | | | | |
|---|---|---|---|---|
| 5,453,601 A | * | 9/1995 | Rosen | 705/65 |
| 5,581,064 A | | 12/1996 | Riley et al. | |
| 5,768,385 A | * | 6/1998 | Simon | 705/69 |
| 5,832,089 A | * | 11/1998 | Kravitz et al. | 705/69 |
| 5,937,394 A | * | 8/1999 | Wong et al. | 705/26.1 |
| 5,983,207 A | * | 11/1999 | Turk et al. | 705/39 |
| 6,122,625 A | | 9/2000 | Rosen | |
| 6,205,437 B1 | | 3/2001 | Gifford | |
| 7,003,479 B2 | | 2/2006 | Cowell et al. | |
| 7,013,286 B1 | | 3/2006 | Aggarwal et al. | |
| 7,269,256 B2 | | 9/2007 | Rosen | |
| 7,578,439 B2 | | 8/2009 | Graves et al. | |
| 7,590,602 B1 | * | 9/2009 | Luzzatto | 705/64 |
| 7,739,168 B2 | | 6/2010 | Gillin et al. | |
| 7,757,090 B2 | | 7/2010 | Silverbrook et al. | |
| 7,814,009 B1 | * | 10/2010 | Frenkel | 705/39 |
| 7,891,122 B2 | | 2/2011 | Lauer et al. | |
| 2002/0013767 A1 | * | 1/2002 | Katz | 705/39 |

(Continued)

FOREIGN PATENT DOCUMENTS

JP 2003-076851 A 3/2003

OTHER PUBLICATIONS e-gold Blocks Account Logins from Exploited Computers. Business Wire, p Na, Apr. 27, 2007.*

(Continued)

*Primary Examiner* — Scott Zare

(74) *Attorney, Agent, or Firm* — Stoel Rives LLP

(57) ABSTRACT

Virtual currency notes may be derived from one or more currency notes deposited at a currency reserve and/or from an asset held by a depository institution. A transaction provider may provide for ownership and/or transfer of the notes by various entities. Ownership of virtual currency notes may be transferred between entities while the depository institution maintains the asset associated therewith. A virtual currency note may be transferred to a transfer account, which may cause an amount equivalent to the virtual currency note to be deposited therein. After the transfer to a transfer account, the transferred virtual currency note may be removed from electronic circulation and/or transferred to another entity.

29 Claims, 9 Drawing Sheets

(56) References Cited

U.S. PATENT DOCUMENTS

| | | | |
|---|---|---|---|
| 2002/0022966 | A1 | 2/2002 | Horgan |
| 2003/0149662 | A1 | 8/2003 | Shore |
| 2003/0187798 | A1 | 10/2003 | McKinley et al. |
| 2004/0193487 | A1 | 9/2004 | Purcell et al. |
| 2006/0041478 | A1 | 2/2006 | Zheng |
| 2006/0116960 | A1 | 6/2006 | Gillin et al. |
| 2007/0150413 | A1 | 6/2007 | Morgenstern |
| 2007/0179883 | A1* | 8/2007 | Questembert ............ 705/39 |
| 2007/0244812 | A1* | 10/2007 | Turk et al. ............... 705/39 |
| 2007/0255653 | A1 | 11/2007 | Tumminaro et al. |
| 2007/0276727 | A1 | 11/2007 | Thibedeau |
| 2008/0040274 | A1 | 2/2008 | Uzo |
| 2008/0195499 | A1 | 8/2008 | Meredith et al. |
| 2008/0262928 | A1 | 10/2008 | Michaelis |
| 2008/0262969 | A1 | 10/2008 | Samid |
| 2009/0076912 | A1 | 3/2009 | Rajan et al. |
| 2009/0094134 | A1 | 4/2009 | Toomer et al. |
| 2009/0119190 | A1 | 5/2009 | Realini |
| 2009/0119209 | A1 | 5/2009 | Sorensen et al. |
| 2009/0299848 | A1 | 12/2009 | Cao et al. |
| 2009/0319433 | A1* | 12/2009 | Luzzatto ............... 705/75 |
| 2010/0088231 | A1* | 4/2010 | Eugenio ............... 705/44 |
| 2010/0275267 | A1 | 10/2010 | Walker et al. |
| 2011/0079644 | A1 | 4/2011 | Wolfe et al. |
| 2011/0103653 | A1 | 5/2011 | Keswani et al. |

OTHER PUBLICATIONS

Jung, Wook et al., "A Comparison of Electronic Cash Schemes and Their Implementations," ECE 646 AS-3 Group Project, George Mason University, 50 pgs.

"CashEdge Unveils a P2P Service to be Controlled by Banks," http://www.javelinstrategy.com/2009/06/24/cashedge-unveils-a-p2p-serv . . . , Jun. 24, 2009, printed Jul. 15, 2009, 1 pg.

"Anti-anti money laundering," http://digitaldebateblogs.typepad.com/digital_money/2009/06/anti-anti-m . . . , Jun. 7, 2009, printed Jul. 15 2009, 3 pgs.

"Pay With Facebook? No Thanks!" http://www.worldboxx.com/pay-with-facebook-no-thanks/, printed Jul. 15, 2009, 2 pgs.

KINCAID, Jason, "Facebook Revs Up for Payment Platform with Updated Terms," http://www.techcrunch.com/2009/05/29/facebook-revs-up-for-payment-pl . . . , May 29, 2009, printed Jul. 15, 2009, 3 pgs.

"Should the Fed be the 14$^{th}$ Payment Network, and How Would That Solve the Problems?" http://thebankwatch.com/2009/05/261should-the-fed-be-the-14th-payment . . . , printed Jul. 15, 2009, 2 pgs.

"New to Virtual Currency? Where to begin (Part 2)," http://blog.twofish.com/2009/04/new-to-virtual-currency-where-to-begin-, printed Jul. 15, 2009, 2 pgs.

Rutherford, Lisa, "The Universal Currency Wars Are Coming," http://venturebeat.com/2009/05/29/the-universal-currency-wars-are-coming/, May 29, 2009, printed Jul. 15, 2009, 3 pgs.

Cardinale, Matthew, "Local Currencies Really Can Buy Happiness," May 30, Atlanta, Georgia, http://ipsnorthamerica.net/print.php?idnews=2280 printed Jul. 15, 2009, 2 pgs.

Wolfers, Justin, "Forecast: There Will Be No More Cash in 2012," http://freakonomics.blogs.nytimes.com/2009/05/19/forecast-there-will-be . . . , May 19, 2009, printed Jul. 15, 2009, 1 pg.

Van Dyke, James, "American President Says, 'Tear Down That Wall!' (wait, it's Obama instead of Reagan, and he's using money transfers!)," http://www.javelinstrategy.com/2009/04/13/american-president-says-tear . . . , Apr. 13, 2009, printed Jul. 15, 2009, 1 pg.

International Search Report with Written Opinion for PCT/US2010/036252 filed May 26, 2010, and mailed Jan. 3, 2011, 9 pgs.

International Preliminary Report on Patentability for PCT/US2010/036252 filed May 26, 2010, and mailed Dec. 8, 2011, 6 pgs.

Office Action for U.S. Appl. No. 12/472,249, filed May 26, 2009, mailed Oct. 11, 2011, 16 pgs.

U.S. Patent Office, Office Action for U.S. Appl. No. 12/472,249, mailed Apr. 2, 2012.

U.S. Patent Office, Office Action for U.S. Appl. No. 13/418,176, mailed Feb. 13, 2013.

U.S. Patent Office, Office Action for U.S. Appl. No. 13/322,103, mailed Feb. 26, 2013.

U.S. Patent Office, Office Action for U.S. Appl. No. 13/841,683, mailed Jun. 28, 2013.

Carlo Blundo et al., "A Lightweight Protocol for the Generation and Distribution of Secure E-coupons," WWW2002, May 7-11, 2002, Honolulu, Hi, USA, ACM 1-58113-449-5/02/0005.

* cited by examiner

SYSTEMS AND METHODS FOR ELECTRONICALLY CIRCULATING A CURRENCY

CROSS-REFERENCE TO RELATED APPLICATIONS

This application is a continuation-in-part of U.S. patent application Ser. No. 12/472,249 filed on May 26, 2009, and entitled "Systems and Methods for Electronically Circulating a Currency," which is hereby incorporated by reference in its entirety.

TECHNICAL FIELD

This disclosure relates to payment transaction systems and, in particular, to systems and methods for electronically circulating a currency.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Various payment systems are available through which a payee may accept payment from a payer. Many of these payment systems impose transaction costs. For example, a credit card transaction may include fixed and percentage-based transaction costs payable to the credit card issuer and/or a credit card authorization service.

In addition, many conventional payment systems require that the payer and/or payee be registered with a payment service (transaction provider). For example, in order to pay via credit card, the payee must apply, and be approved for, a credit account with a credit card issuer. Similarly, the payee may be required to have a merchant account with the card issuer (or have some other arrangement for accepting credit card payments). Some potential payees may not wish to register with a credit card issuer and/or may not qualify for a credit line with the card issuer.

Furthermore, the transaction may require that the payer and payee provide personal information to the transaction provider. For example, the payer may be required to provide personal information in order to apply for an account with a transaction provider (e.g., credit card issuer), and the payee may be required to register a merchant account to receive payments through the transaction provider. Other transaction systems (e.g., bank transfers, many on-line transaction systems, and the like) may require that personal information be disclosed.

This private, personally-identifying information may be maintained in confidence by the transaction provider (e.g., credit card issuer). However, information leakage may occur. For example, merchants and transaction providers have experienced data breaches wherein customers' personal information has been exposed.

Moreover, the transaction between the payer and payee may require the payer to expose personal information. For example, in a credit card transaction, the payer may be required to provide a credit card number, verification number, and/or a signature. This information could be used at a later time to make fraudulent transactions using the payer's card.

The systems and methods disclosed herein may provide for electronically circulating a currency to thereby provide low-cost transactions, which may minimize the need for personal information to be exchanged between transacting entities. In addition, the transactions disclosed herein may be performed using little or no personally-identifying information.

Figure 1A:
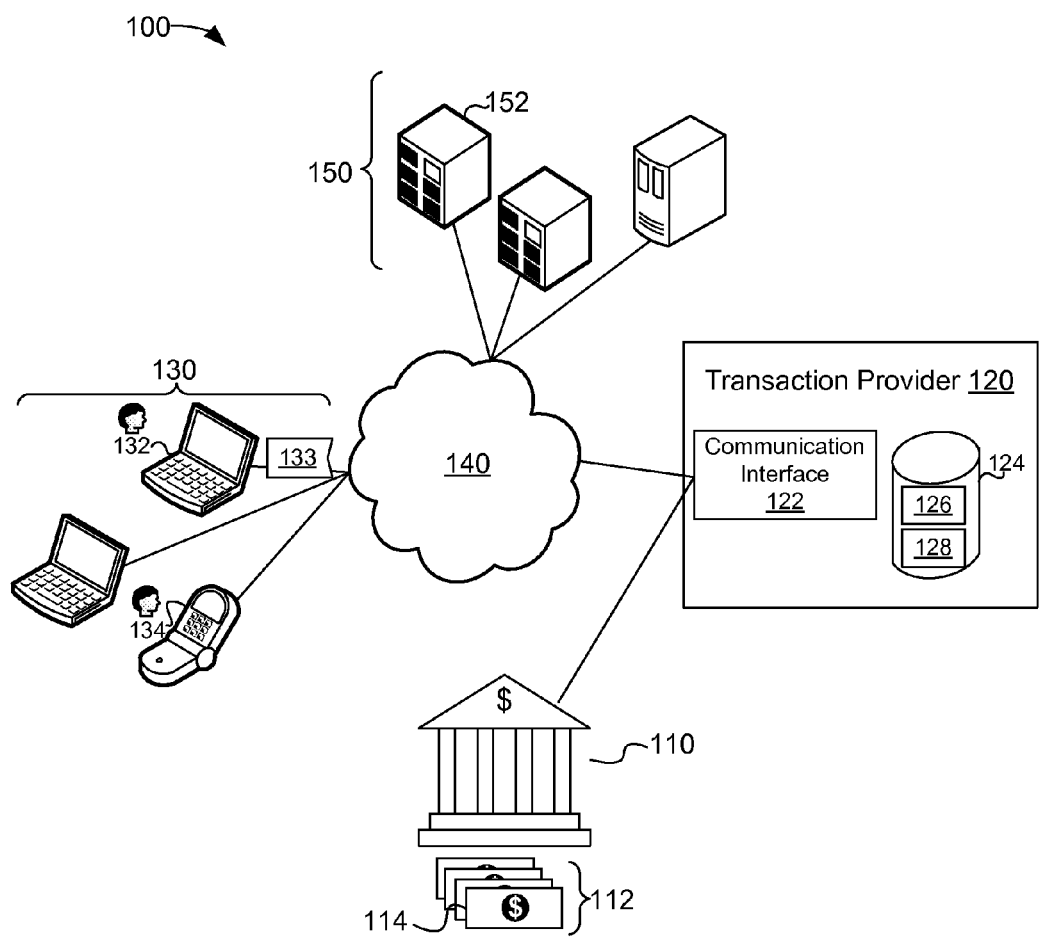
FIG. 1A is a block diagram of one embodiment of a system for electronically circulating a currency.

FIG. 1A is a block diagram of one embodiment of a system for electronically circulating a currency. The system 100 includes a currency reserve 110, which may be a depository institution, such as a bank, a savings bank, a credit union, a financial institution, or any other entity capable of holding currency.

The currency reserve 110 may comprise a set of currency notes 112 that are dedicated for use by the currency circulation system 100. The currency notes 112 may include any currency type in any denomination. For example, the currency notes 112 may include a plurality of United States dollars in one (1) dollar denominations, five (5) dollar denominations, ten (10) dollar denominations, and so on.

Each of the currency notes 112 may have certain attributes from which a unique identifier of the currency note may be derived (a unique currency note identifier or "UCNID"). For example, United States dollar currency notes may include a serial number, a series date, and other attributes. These attributes may be used to generate a UCNID for the note, which may uniquely identify the currency note.

The system 100 includes a transaction provider 120. The transaction provider 120 may comprise one or more computing devices (e.g., server computers), each of which may comprise one or more processors (not shown), memory units (not shown), a computer-readable storage medium 122, human-machine interface (HMI) components (e.g., input/output devices, displays, etc., (not shown)), communication interfaces 124, and the like.

The transaction provider 120 may be implemented using one or more computer-readable instructions stored on a computer-readable storage medium (e.g., the computer-readable storage medium 122). Therefore, portions of the transaction provider 120 may be embodied as discrete software modules on the computer-readable storage medium 122. Other portions and/or components of the transaction provider 120 may be implemented using one or more hardware components and/or may be tied to particular hardware components. For example, the data structure 126 (discussed below) may be tied to the computer-readable storage medium, and/or the communication interface 124 may be tied to particular communications devices (e.g., network interface cards, wireless transmitters, etc.). Therefore, portions of the transaction provider 120 may be tied to a particular machine.

The transaction provider 120 may be communicatively coupled to the currency reserve 110. The communication therebetween may be continuous and/or periodic. The transaction provider 120 may receive from the currency reserve a listing of currency notes 112 in the currency reserve. The listing may include attributes of the currency notes 112, such as the denomination, serial number, and the like. The transaction provider 120 may be configured to derive respective UCNID for the currency notes 112 using this information. The transaction provider 120 may store a representation of each currency note 112 in a data structure 126 stored on the computer-readable storage medium 122. As will be described below, the transaction provider 120 may use the data structure 126 to maintain a record of the currency notes 112 and/or to manage ownership of the currency notes 112 by one or more entities 130. The transaction provider 120 may be in communication with the currency reserve 110 to periodically audit the currency notes 112. An audit of the currency notes 112 may comprise verifying that the currency notes 112 represented in the data structure 126 are physically present at the currency reserve 110. In addition, the transaction provider 120 may be coupled to the currency reserve 110 to manage transfer of currency into and/or out of the set of currency notes 112 dedicated to the electronic currency circulation system 100.

The data structure 126 may include a representation of the currency notes 112 in the currency reserve 110. The currency notes 112 may be represented using respective UCNIDs associated with each currency note 112. As discussed above, the UCNID of currency note may be derived from one or more attributes of the currency notes 112 (e.g., the issuer of the currency note, a serial number of the currency note, issue date of the currency note, or the like). In some embodiments, the UCNID of a currency note 112 may be embodied as a uniform resource identifier (URI), a uniform resource locator (URL), a distinguished name (DN), a hash value, or the like. Use of a URI or URL may allow the currency note representations to be referenced on the communication network 140 (e.g., may allow one or more entities 130 to access ownership (and other) information about a currency note circulated by the transaction provider 120 using the URI/URL assigned to the currency note).

The transaction provider 120 may be communicatively coupled to one or more entities 130 via the communication network 140, which may comprise any communication network and/or infrastructure known in the art (e.g., a TCP/IP network, the Internet, a virtual private network (VPN), a wide area network (WAN), a public switched telephone network (PSTN), a combination of networks, or the like).

As shown in FIG. 1A, the entities 130 may be communicatively coupled to the transaction provider 120 by the communication network 140 through respective computing devices. As used herein, an entity may refer to an individual person, an organization, a business organization (e.g., a limited liability company (LLC), a partnership, or any other business organization), a storefront, a group, a non-profit organization, or any other entity capable of entering into monetary transactions with other entities.

Each entity 130 may be identified using a respective identifier. The identifier for a particular entity 130 may be referred to as a unique entity identifier or "UEID." A UEID may include, but is not limited to: an email address, a DN, a URI, a uniform name identifier (URN), an OpenID® identifier (registered trademark of the OpenID Foundation Corp., Portland, Oreg.), or any other identifier capable of uniquely identifying an entity (e.g., a legal name, a corporate name, a doing business as (DBA) name, or the like).

In some embodiments, one or more of the entities 130 may be associated with a third-party service 150, which may be configured to authenticate the entities 130 and/or authenticate messages transmitted by the entities 130. The third-party service 150 may include, but is not limited to: a certificate authority (e.g., an X.509 certificate authority), an authentication authority and/or identity provider (e.g., a Security Assertion Markup Language (SAML) authentication authority, a Liberty Alliance Authenticating Authority, an OpenID® provider, etc.), or any other service capable of authenticating the identity of an entity 130 and/or validating the authenticity of data transmitted thereby. In some embodiments, the transaction provider 120 may be configured to provide authentication and/or authorization services (e.g., may act as an authentication/authorization authority).

The transaction provider 120 may be configured to assign ownership of the currency notes 112 to one or more of the entities 130. In some embodiments, assigning ownership may comprise associating a UCNID of a currency note with a unique identifier of the current owner of the currency note in the data structure 126, while maintaining the currency notes 112 in the currency reserve 110. The transaction provider 120 may use the data structure 126 to maintain the ownership associations. As will be discussed below, the entities 130 may enter into currency circulation transactions (e.g., transaction to transfer ownership of the currency notes (e.g., make payments, etc.)) using the transaction provider 120. The transactions disclosed herein may take place without requiring the physical transfer of the currency notes 112 into and/or out of the currency reserve 110, which may minimize transaction costs. Moreover, the transfers disclosed herein may take place using a third-party service 150 and, as such, minimal personally-identifying information about the entities 130 need be exposed to the transaction provider 120.

The data structure 126 may be implemented using any data storage technique known in the art including, but not limited to: a file system, structured data (e.g., XML, as delimiter-separated values, etc.), a relational data store (e.g., a database), a directory (e.g., a Lightweight Directory Access Protocol (LDAP) directory, an X.509 directory, or the like), or the like. In the FIG. 1A example, the data structure 126 may be implemented using a Structured Query Language (SQL) database.

Figure 2A:
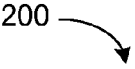
FIG. 2A depicts one embodiment of a data structure to maintain ownership information of an electronically circulated currency note maintained in a currency reserve.

FIG. 2A shows one example of a data structure (e.g., a database table) 200, which may be used by a transaction provider (e.g., transaction provider 120) to electronically circulate a currency note maintained in a currency reserve.

The table 200 includes a currency note identifier field 210, which may be used to store the UCNID of a particular currency note (e.g., one of the currency notes 112 deposed in a currency repository 110). The UCNID 210 may be used as a "primary key" of the table 200 and, as such, may be used to identify and/or reference a specific instance of the table 200.

The table 200 may further include an owner field 212. The owner field 212 may be used to store an identifier of the owner of the currency note (e.g., the UEID of the owner). The owner field 212 may be used as a "primary key" to index the table 200 (e.g., as a primary key, a foreign key, or other indexing data). This may allow for quick identification of the currency notes owned by a particular entity.

In other embodiments, the ownership field 212 may comprise a list of partial owners of the currency note. In this case, multiple owners may each own a portion (e.g., a percentage) of a currency note (e.g., two (2) owners may each own fifty (50) percent of a currency note). Each owner may be allowed to transfer his/her ownership interest in the currency note.

In some embodiments, the owner field 212 may comprise a list that may include the current owner of the currency note as well as any previous owners. For example, the current owner of the currency note may be placed at the head of the field 212, with the following UEIDs being the previous owners of the currency note. Alternatively, or in addition, information regarding the ownership history of the currency note may be maintained in a separate field (not shown) of the table 200. Other embodiments may selectively omit the ownership history of the currency note.

In addition, although not shown in FIG. 2A, the data structure 200 may include references (e.g., identifiers, foreign keys, etc.) to records of transaction in which the currency note was transferred between entities. As will be discussed below, a transaction provider may provide for transferring ownership of one or more currency notes from a first entity to a second entity. As transfers take place, the transaction provider may produce an electronic and/or tangible record of the transfer, which may identify the parties to the transaction, the currency notes transferred, the date of the transfer, and the like. The data structure 200 may include a field (not shown) referencing the transactions in which the currency note was transferred. This may allow for auditing and/or validation of particular transfers and/or for the transaction history of a particular set of currency notes to be traced.

The table 200 may include information describing the currency note. A field 220 may identify the currency note type and/or currency note issuer (e.g., identify the currency note as a United States dollar, a Euro, or the like). A field 222 may identify the denomination of the currency note (e.g., whether the note is a one (1) dollar bill, a five (5) dollar bill, and so on). Alternatively, or in addition, the UCNID of the currency note (stored in field 210) may include the denomination information and/or may be used to validate the denomination information in the field 222. In this way, the currency note denomination may be tied to the UCNID to thereby prevent the denomination field 222 from being tampered with and/or modified. Although not depicted in FIG. 2A, additional fields related to the currency note could be included, such as the date the currency note was deposited in the currency reserve (not shown), and the like.

In some embodiments, the table 200 may include information regarding the currency repository that holds the physical currency note. For example, a field 230 may provide a unique identifier of the currency repository (a unique currency repository identifier of "UCRID"). The UCRID may be a "foreign key" that identifies a table comprising information about the currency repository (not shown). A currency repository data structure (e.g., database table) could include an address of the currency repository, contact information for the currency repository, the date the currency note was verified to exist at the currency repository, auditing information (e.g., instructions for performing an audit of the currency repository to ensure that the physical currency note is present at the currency repository), and the like. Alternatively, the table 200 may include information regarding the currency repository directly in one of more fields (not shown).

Referring back to FIG. 1A, the transaction provider 120 may be configured to maintain a record of the ownership of one or more the currency notes 112 using inter alia the data structure 126. An entity 130 may become the owner of a currency note in various ways, including, but not limited to: purchasing one or more currency notes 112 from a currency repository 110 and/or the transaction provider 120, transferring one or more currency notes 112 into a currency repository 110, receiving ownership of one or more currency notes 112 from another entity 130 (e.g., via a transfer), or the like.

For example, a particular entity 132 may purchase one or more currency notes 112 from a currency repository 110. The purchase may be performed directly with the currency repository 110 (e.g., by exchanging currency, issuing a check, performing a wire transfer, a credit card transaction, or the like). Alternatively, the currency may be purchased through the transaction provider 120. For example, the entity 132 may issue a request to the transaction provider 120 to purchase one or more currency notes 112 in a currency repository 110. The transaction provider 120 may arrange a transfer of funds between the entity 132 and the currency repository 110 (e.g., via a currency exchange, check, wire transfer, credit card transaction, or the like). Purchasing a currency note by the entity 132 may not require that the currency notes 112 be relocated from the currency repository 110. For example, a number of currency notes 112 may be owned by the currency repository 110 and/or the transaction provider 120. Therefore, as the currency notes are purchased by the entity 132, the ownership of the currency notes 112 may be updated, but no deposit or other physical handing of the notes 112 may be required. Alternatively, or in addition, the entity 132 may directly deposit one or more currency notes in the currency reserve 110 for inclusion in the currency notes 112.

The currency notes deposited by the entity 132 may be registered with the transaction provider 120. As described above, registration of a currency note may comprise the transaction provider 120 assigning respective UCNIDs to the currency notes and/or assigning ownership of the currency notes (e.g., to the depositor/purchaser of the currency notes, such as the entity 132, the transaction provider 120, and/or the currency reserve 110 itself). As discussed above, assigning ownership to a currency note 112 may comprise associating the UCNID of the current note with a unique identifier of the owner (e.g., a unique identifier of an entity 130 (the UEID of the entity 130), an identifier of the currency reserve 110, an identifier of the transaction provider 120, or the like).

The transaction provider 120 may provide a mechanism whereby ownership of currency notes 112 may be transferred between the entities 130. The transfer of ownership may be performed while maintaining the currency notes 112 in the currency reserve 110.

The transaction provider 120 may be configured to receive a transfer request from an entity 130, the request specifying one or more currency notes 112 to transfer to another entity 130. The transaction provider 120 may authorize the request and, if the request is authorized, may transfer ownership of the one or more currency notes 112. Transferring ownership may comprise the transaction provider 120 setting another entity 130 as the owner of the one or more currency notes in the data structure 126.

As an illustrative example, the transaction provider 120 may receive a transfer request 133 from the first entity 132 to transfer a particular currency note 114 to a second entity 134 (e.g., make a payment to the second entity 134) over the network 140. The transfer request 133 may include an identifier of a currency note 114 to transfer (e.g., include the UCNID of the currency note 114), the UEID of the first entity 132, and an identifier of the second entity 134.

The transaction provider 120 may authorize the transfer request 133 and, if the transfer request 133 is authorized, may transfer ownership of the currency note 114 to the second entity 134. Authorizing the request may comprise verifying that the first entity 132 is the current owner of the currency note 114. The transaction provider 120 may query the data structure 126 to determine ownership of the currency note 114. The query may comprise accessing a data entry associated with the currency note 114 (e.g., the UCNID of the currency note 114) in the data structure 126 (e.g., database table, such as table 200 of FIG. 2A). Ownership may be determined by comparing the owner field of the data entry associated with the currency note (e.g., the value of the owner field 212 of FIG. 2A) to the UEID of the first entity 132. If the identifiers match, the transaction provider 120 may verify that the first entity 132 is the owner of the currency note 114, and the requested transfer may proceed; otherwise, the transaction provider 120 may determine that the first entity 132 is not the owner, and the request may be rejected.

After authorizing the request, the transaction provider 120 may transfer the currency note 114 from the first entity 132 to the second entity 134. As discussed above, transferring ownership may comprise associating the currency note 114 with the second entity 134 in the data structure 126. In the FIG. 2A example, transferring may comprise setting the current owner field 222 to an identifier (e.g., a UEID) of the second entity 134 (as provided in the transfer request 133).

In some embodiments, the transfer request 133 may not specify a particular currency note 114, but instead, may request that ownership of a particular amount of currency (e.g., six (6) dollars) be transferred to the second entity 134. In this case, the transaction provider 120 may be configured to identify currency notes 112 owned by the first entity 132 in the data structure 126 that amount to the requested transfer amount. If the currency notes can be identified (e.g., if the first entity 132 owns enough currency to fulfill the transfer request 133), the transfer may proceed as described above (e.g., ownership in the identified currency notes may be transferred to the second entity 134). Alternatively, or in addition, the transaction provider 120 may be configured to automatically exchange one or more currency notes owned by the first entity 132 for currency notes of the requested type and/or amounting to the requested transfer amount. For example, the transaction provider 120 may exchange a twenty (20) dollar currency note owned by the first entity 132 for one (1) ten dollar currency note, a five (5) dollar currency note, and five (5) one (1) dollar currency notes, and to transfer to the second entity 134, the five (5) dollar currency note and one (1) one (1) dollar currency note. Other exchanges may be made. For instance, the transaction provider 120 may be configured to exchange United States currency for Canadian currency, to transfer partial ownership in one or more currency notes, and so on.

The transfer request 133 may comprise a unique identifier UEID of the transferee (e.g., the UEID of the second entity 134). The UEID of the second entity 134 may be an email address of the second entity 134, a DN of the second entity 134, or any other identifier of the second entity 134. Alternatively, or in addition, the second entity 134 may establish one or more aliases with the transaction provider 120. The aliases may provide for redirection of transfers to a particular unique identifier to another unique identifier. For instance, an alias may specify that transfers directed to "john.doe@yahoo.com" be redirected to "john.doe@openid.org." Therefore, a transfer request specifying a transfer to "john.doe@yahoo.com" may result in a transfer to "john.doe@openid.org." The first entity 132 may or may not be informed of the alias.

After processing the transfer request 133, the transaction provider 120 may be configured to transmit a record of the transaction to the first entity 132, the second entity 134, and/or the currency reserve 110. In addition, the transaction provider 120 may store a record of the transaction in the data structure 126 (e.g., in a table or other data structure adapted to store transaction records) and/or may generate a tangible record of the transaction (e.g., a paper receipt). The transaction request 133 may specify how the record of the transaction is to be processed (e.g., may specify confirmation email addresses, a physical address where a receipt may be mailed, and so on). The transaction provider 120 may be configured to provide recording of transaction requests that are fulfilled and/or of transaction requests that are not fulfilled (e.g., due to insufficient funds, non-ownership of currency, or the like).

In some embodiments, authorizing a transfer request may further comprise authenticating the transfer request and/or validating that the transfer request was authorized by the transferor. The transaction provider 120 may use one or more third-party authentication/authorization services 150 to authenticate the entities 130 and/or to verify communications received therefrom (e.g., verify transfer requests received from the entities 130). For instance, the first entity 132 may be associated with a particular third-party authentication/authorization service 152, such as an OpenID® provider. In this case, the transaction provider 120 may be configured to receive information authenticating the identity of the first entity 132 from the third-party service 152. For instance, the first entity 132 may provide an authentication credential to the service 152, which may authenticate the identity of the first entity 132 to the transaction provider 120 (e.g., via an application programming interface (API), such as the OpenID API, SAML API, Simple Object Access Protocol (SOAP), WS-Security API, or the like). In this way, the transaction provider 120 may authorize a transaction without receiving sensitive information from either entity 132 and/or 134.

Alternatively, or in addition to authenticating the identity of the entities 130, the transaction provider 120 may be configured to verify that communications transmitted to the provider 120 were made by and/or authorized by a particular entity 130 and/or verify the integrity of the communications. In some embodiments, the transaction provider 120 may be configured to communicate with the entities 130 over a secure connection, such as Secure Socket Layer (SSL) connection, or the like. The communications layer may provide verification of the integrity of messages transmitted thereon (e.g., verify that the request 133 was not tampered with and/or modified). In addition, the communications layer may provide authentication services (e.g., mutually authenticated SSL). The communications themselves (e.g., the transfer request 133) may include authentication/verification information, such as an HTTP AUTH header, a token, a digital signature, or the like. For example, the transfer request 133 may include a digital signature referencing a digital certificate issued to the first entity 132. The transaction provider 120 may access a third-party server 150 (e.g., certification authority) to verify the authenticity of the signature/certificate. This operation may validate the integrity of the message 133 and verify that the message was transmitted by and/or authorized by the first entity 132.

Alternatively, or in addition, the transaction provider 120 may be configured to authenticate one or more of the entities 130 directly. For example, the transaction provider 120 may provide for registration of one or more entities. Registration may comprise associating an identifier of the entity 130 (the UEID of the entity 130) with an authentication credential, such as a login name and/or password. An entity 130 may provide the credential to the transaction provider 120, which may use the credential to verify the identity of the entity 130.

Although particular authentication and/or message verification techniques are discussed herein, the transaction provider 130 could be configured to implement and/or leverage any authentication and/or verification technique available in the art. Therefore, this disclosure should not be read as limited in this regard.

The transaction provider 120 may provide for additional transaction types (e.g., may provide for other means for electronically circulating a currency). For instance, the transaction provider 120 may allow an entity 130 to exchange a first set of currency notes for a second set of currency notes. For example, the first entity 132 may be the owner of a currency note 114 for twenty (20) United States dollars. The first entity 132 may submit an exchange request to the transaction provider 120 to exchange the currency note 114 for a second set of currency notes (e.g., two (2) ten (10) United States dollar currency notes). The transaction provider 120 may authorize the exchange request (e.g., by verifying that the request was submitted and/or authorized by the first entity 132 and/or determining that the first entity 132 is the owner of the currency note 114). If the exchange request 133 is authorized, the transaction provider may transfer ownership of the currency note from the first entity 132 to another entity 130, to the currency reserve 110, and/or to the transaction provider 120, and may transfer ownership of the second set of currency notes (e.g., two (2) ten (10) dollar currency notes) to the first entity 132. The transaction provider 120 may provide for any type of currency exchange. For example, the first entity 132 may exchange United States currency for currency issued by another entity (e.g., Canadian currency, Euros, or the like). In this case, the currency reserve 110 may include currency notes 112 of many different types. Alternatively, or in addition, the transaction provider 120 may be communicatively coupled to additional currency reserves (not shown) in one or more foreign locales (e.g., in Canada, the European Union, and so on).

In some embodiments, the transaction provider 120 may provide an invoice data structure 128, which may be used by the entities 130 to track and/or manage transfers within the system 100. An invoice data structure 128 may be assigned an identifier (a unique invoice identifier (UIID)), which may correspond to a URI (e.g., a distinguished name, URL, or the like) and, as such, may be accessible to the entities via the network 140. An invoice may identify a payee entity (transferee entity), a payer entity (transferor entity), and an invoice amount. The payee entity may be an entity 130 who is to receive a payment under the invoice, and the payer entity may be the entity 130 who is to a currency transfer under the invoice. The invoice amount may identify the amount of currency to be transferred under the invoice (including denomination, type, and the like).

An invoice data structure 128 may further include information describing a transaction related to the invoice, such as the sale of a product, procurement of a service, or the like. Accordingly, an invoice data structure 128 may include a link to an auction, a product description, a service description, provide terms of sale (e.g., delivery date, purchase terms), terms of service (license agreement, etc.), and the like.

The invoice payer may transfer one or more currency notes to the invoice. Transferring currency notes to an invoice may comprise transmitting a transfer request (e.g., request 133) to the transaction provider comprising a UIID. Responsive to the request, the transaction provider may transfer ownership of the currency notes to the payee associated with the invoice, and may modify the invoice data structure 128 to indicate that the invoice has been paid (e.g., include UCIDs of the currency used to pay the invoice). Accordingly, when the payer pays an invoice (transfers the invoice amount thereto), the entity identified as the invoice payee may be given ownership of the transferred notes. The invoice data structure maintained by the transaction provider 120 may also include fields to record the UCIDs of currency notes transferred to the invoice (currency notes transferred to pay the invoice amount). Therefore, both the invoice payer and payee may determine when and how a particular invoice was paid. As such, invoices may be used to track inbound payments (e.g., for order fulfillment, accounts payable, etc.), as well as outbound payments (e.g., act as a proof of purchase, receipt, or the like).

Figure 1B:
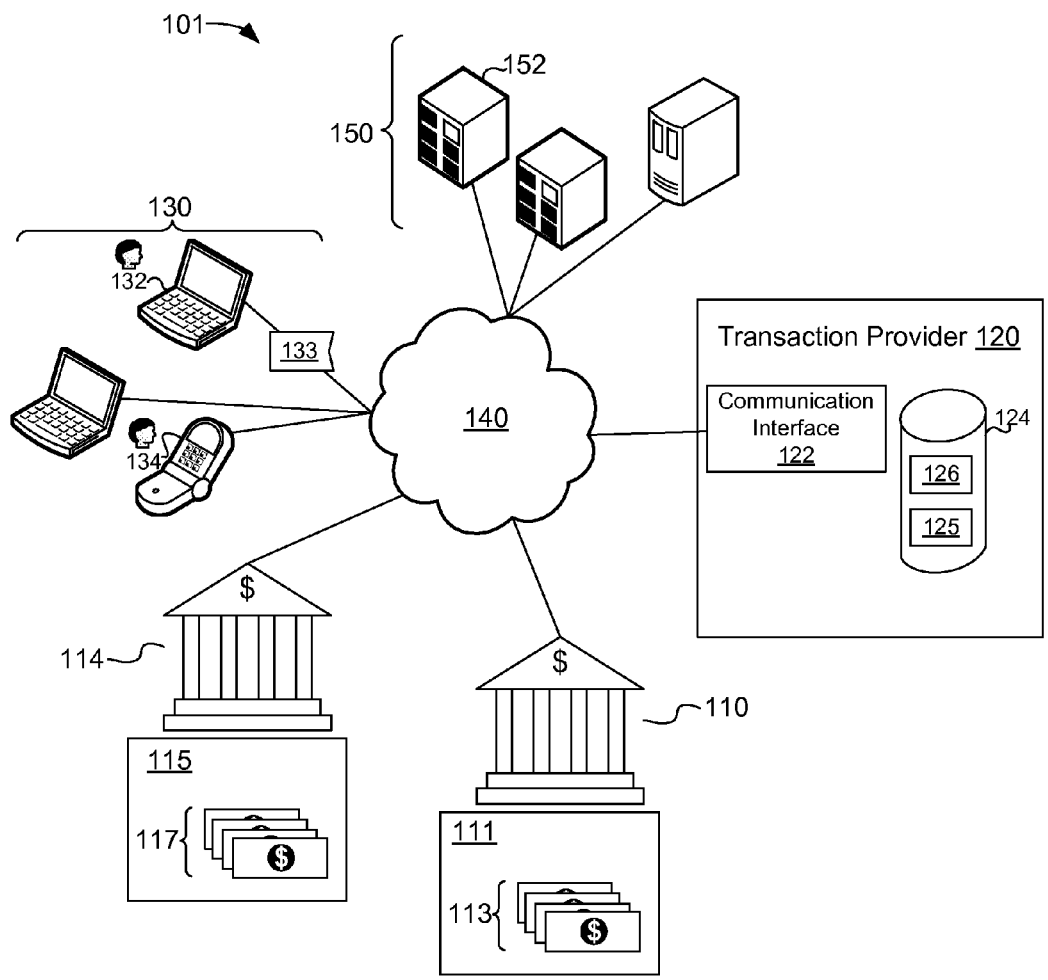
FIG. 1B is a block diagram of another embodiment of a system for electronically circulating a currency.
Figure 2B:
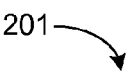
FIG. 2B depicts one embodiment of a virtual currency data structure.
Figure 2C:
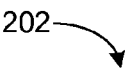
FIG. 2C depicts one embodiment of an invoice data structure.

FIG. 2C provides an example of an invoice data structure 202, which may be maintained by a transaction provider, such as the transaction provider 120 of FIG. 1A-B. The invoice data structure 202 may include a unique invoice identifier (UIID) 250, which may be embodied and/or associated with a URL. The URL may allow entities to reference the invoice data structure 250 via the Internet (e.g., using a web browser or the like). An invoice amount field 252 may indicate the amount of currency that is to be transferred under the invoice. In some embodiments, the amount field may further include a list of preferred denominations, currency type, and so on.

An invoice payment field 251 may indicate if the invoice has been paid. The invoice payment field 251 may comprise a simple "true" or "false" indicator. Alternatively, or in addition, the payment field 251 may comprise the UCIDs of the currency notes transferred to pay the invoice, provide a date of payment, and so on.

An invoice details field 254 may provide a description of the invoice, including a detailed description of the invoice amount 252. For example, the details field 254 may identify a product or service associated with the invoice (e.g., provide a link to an auction or catalog), may provide terms of a purchase, may provide terms of service, provide itemized cost information used to calculate the invoice amount 252, and so on.

An invoice payee field 256 may comprise a UEID of the payee under the invoice (the entity who is to retain ownership of any currency notes transferred to the invoice). The invoice payer field 258 may comprise a UEID of the payer under the invoice (the entity from which the currency is to be transferred or the entity who ultimately transfers currency to the invoice). In some embodiments, the payer UEID field 258 may be populated when the invoice data structure 202 is created. In this case, the invoice 202 may be directed to a particular entity. Alternatively, the payer UEID field 258 may not be populated until the invoice is actually paid, at which point the payer UEID field 256 may be populated with the UEID of the entity who transferred the currency to pay the invoice. When processing a currency transfer to an invoice, a transaction provider may only accept payment from the entity identified in the payee field 258 (e.g., a first entity may not be allowed to pay the invoice of a second entity). Alternatively, the transaction provider may allow any entity to transfer currency to the invoice (e.g., a first entity may pay the invoice of a second entity). In some embodiments, the payee UEID 256 and/or the payer UEID 258 may or may not be visible to other entities (e.g., the invoice payer may not know the identity of the payee and vice versa).

Referring back to FIG. 1A, a first entity 132 may generate an invoice using the transaction provider. The invoice may include an invoice amount, invoice details, and so on. The invoice may identify the first entity 132 as the invoice payee. Alternatively, a different payee may be identified (e.g., the first entity 132 may generate the invoice on behalf of another entity 130 and/or as a purchaser).

In response to the request, the transaction provider may generate an invoice data structure 128 comprising a unique invoice identifier (UIID). The UIID may comprise and/or be associated with a URL, which may allow entities 130 to access the invoice via the network 140.

In one example, an invoice data structure 128 may be generated by a first entity 132 to invoice a second entity 134 for a product or service. The invoice may include an invoice amount (field 252 of FIG. 2C) and provide details regarding the transaction (e.g., identify a particular product, service, or the like in field 254 of FIG. 2C). The second entity 134 may transfer currency notes to the invoice using inter alia a transfer request 133 to transfer currency notes in the amount specified in the invoice 128 to the UIID. The transfer request 133 may be handled similarly to the entity-to-entity transfer discussed above. The transaction provider 120 may perform the transfer by transferring ownership of the identified currency notes to the payee identified in the invoice data structure 128 (field 256 of FIG. 2C) as described above. A payer field of the invoice data structure 128 (field 258 of FIG. 2C) may be updated to indicate which entity 130 transferred the currency notes to pay the invoice. The transfer may further include the transaction provider 120 updating a payment field of the invoice data structure 128 (field 251 of FIG. 2C) to indicate that the invoice has been paid (e.g., by setting a paid indicator to "true," providing UCIDs of the currency notes used to pay the invoice, or the like).

In another example, the first entity 132 may generate an invoice data structure 128 that does not identify any particular entity 130 as the invoice payer. This type of invoice may represent an open "offer to sell" available to any entity 130; any entity 130 may accept the offer by fulfilling the terms of the invoice (e.g., transferring the required invoice amount thereto). Therefore, any entity may transfer currency to the invoice (generate a transfer request 133 directed to the UIID). Upon receiving payment of the invoice, the first entity 132 may provide the specified product or service to the entity identified as the payer in the invoice data structure 128 (or as directed by the entity identified as the payer in the invoice data structure 128).

The transaction provider 120 may provide for adding currency notes to the currency reserve 110 (e.g., a deposit transaction), withdrawing currency notes and/or exchanging currency notes from a currency reserve 110, and so on. In some embodiments, the transaction provider 120 may provide for adding currency notes in a point-of-sale or kiosk device (not shown). Currency may be fed into the device by the entity (e.g., the first entity 132). Equivalent currency notes may be assigned to the first entity 132 responsive to the deposit. The first entity 132 may then use the currency notes in electronic currency circulation transactions using the transaction provider 120. Similarly, the first entity 132 may request disbursement of currency notes owned by the first entity (e.g., at a kiosk or other device). For example, the first entity 132 may transmit a request through the device for a particular note owned by the first entity 132 (e.g., currency note 114). Upon authorizing the request, the transaction provider 120 may transfer ownership of the currency note 114 to the currency repository 110 and/or to the transaction provider 120, and an equivalent currency note may be provided to the first entity 132 (e.g., dispensed from the device, provided as a redeemable receipt, or the like).

The transaction provider 120 may provide one or more user interface components to the entities 130. In some embodiments, the user interface components may be provided as web pages accessible using web browser software. Therefore, the transaction provider 120 may comprise and/or be communicatively coupled to one or more web server computers (not shown) each comprising respective processors, memories, computer-readable storage medium, and the like. The transaction provider 120 may be implemented in a clustered configuration (e.g., may comprise a plurality of computing devices in a single location and/or distributed geographically). Although web-based user interface components are described herein, the transaction provider could provide user interface components using any mechanism known in the art (e.g., a dedicated software application, a TELNET portal, or the like). Therefore, the teachings of this disclosure should not be read as limited in this regard.

The interface components provided by the transaction provider 120 may allow the entities 130 to view the currency notes 112 owned thereby, allow for the exchange of currency notes 112, transfer currency notes 112 to other entities 130, view the ownership status of various currency notes 112, view the ownership history of various currency notes 112, view a record of transactions performed by the transaction provider 120, and so on. Access to information regarding a particular entity 130 and/or to particular currency notes 112 may be restricted to particular entities 130. For example, only the first entity 132 and/or those entities authorized by the first entity 132 may be allowed to view the currency notes 112 owned by the first entity 132. Similarly, only the owner of a particular currency note 114 may be authorized to view the ownership status of the currency note 114, view the ownership history of the note, or the like. In other embodiments, access to ownership information may be provided to all interested entities. Access to records of transactions performed by the transaction provider 120 may be restricted to the one or more entities 130 that were parties in the transaction (e.g., access to a record of a transfer of the currency note 114 from the first entity 132 to the second entity 134 may be restricted to the first entity 132 and the second entity 134 and/or to those entities 130 authorized by the first and/or second entities 132 and/or 134). Alternatively, access may be open to all interested entities.

Although FIG. 1A depicts a system 100 in which actual currency notes are electronically circulated (currency notes 114), the teachings of this disclosure are not limited in this regard. For example, the systems and methods disclosed herein may be adapted to circulate a "virtual currency," derived from any asset having a monetary value, such as a deposit account, investment account, precious metal, or the like. Virtual currency notes may be generated and tied to the asset (e.g., account). Ownership of virtual currency notes may be transferred between entities 130 as described above. In some embodiments, virtual currency notes may be electronically circulated with "actual currency" notes in the same system. An example of a system for electronically circulating virtual currency notes (along with "actual" currency notes) is depicted in FIG. 1B.

FIG. 1B is a block diagram of one embodiment of a system 101 for electronically circulating a virtual currency. In the FIG. 1B example, the transaction provider 120 may be configured to circulate a currency represented by an account 111. The account 111 may comprise one or more currency notes 113 and/or may represent a balance at one or more depository institutions 110. Accordingly, in some embodiments, the account 111 may not include a particular set of currency notes 113, but instead may simply be assigned a monetary value (in a particular currency) by the depository institution 110. The monetary value of the account 111 may be fixed and/or insured by the financial institution 110 (e.g., by FDIC insurance, or other insurance provider). The account 111 may be held by a custodian. As used herein, a custodian may refer to an individual, organization, group, or any other entity capable of owning and/or controlling an interest in the account 111.

The transaction provider 120 may circulate currency represented by the account 111. Accordingly, the transaction provider 120 may generate a set of "virtual" currency identifiers, which may be tied to (e.g., associated) with the account 111. The virtual currency identifiers may be embodied as respective URLs, and may be maintained by the transaction provider 120 (in a data structure 125). The data structure 125 may include a plurality of virtual "currency notes," each corresponding to a particular currency denomination. The virtual currency notes maintained in the data structure 125 may sum to a value that is less than or equal to the value of the account 111. For example, if the account 111 had a value of $50,000 USD, the data structure 125 could include a set of virtual currency notes totaling to $50,000 or less. The transaction provider 120 may transfer ownership of the virtual currency notes as described above.

The virtual currency notes associated with the account 111 may be circulated on a per-custodian basis. For example, the system 101 may include a plurality of different accounts 111, each of which may be associated with another custodian. Each custodian may maintain the value of their respective accounts 111 at a particular level (e.g., maintained above a sum of the currency notes circulating in the system 101). For instance, a sum of the values of the virtual currency notes associated with an asset (e.g., the account 111) may be maintained so as to be less than or equal the value of the asset:

$$V_a \geq \sum_{i=1}^{t} n_i \qquad \text{Eq. 1}$$

In Equation 1, $V_a$ represents the value of the asset (account 111), which is to be maintained greater than or equal to a sum of virtual currency notes associated therewith (in Equation 1, t represents the number of currency notes associated with the asset, and $n_i$ is the denomination (value) of a particular electronically circulated current note).

In some embodiments, the transaction provider may allow a custodian to circulate different proportions of the value of the account. For example, an account 111 considered to be volatile (e.g., invested in the stock market), may circulate virtual currency totaling only ½ the value of the account. Alternatively, another account 111 may be allowed to circulate more than the value thereof (e.g., be leveraged). A leveraged account 111 may be expressed as follows:

$$r * V_a \geq \sum_{i=1}^{t} n_i \qquad \text{Eq. 2}$$

In Equation 2, r represents a leverage ratio of an account. If r is less than one, the account may be allowed to circulate less than its value (e.g., the account may be highly volatile), if r is greater than one, the account may be leveraged (e.g., allowed to circulate more than its value).

The custodian of the account 111 may receive and/or transfer currency notes within the system 101. The custodian may have ownership of one or more of the currency notes associated with the account 111. These currency notes may not be counted against the "circulating value" of the account, since they are held by the custodian of the account 111 and, as such, do not necessarily represent a liability of the account 111. The circulating value of the account 111 (or other asset) may, therefore, be calculated as a difference of a sum of the monetary value (denomination) of each virtual currency note associated with the account 111 (or other asset) in circulation within the system 111 (held by other entities and/or otherwise available for circulation) and the virtual currency notes held by the custodian of the account 111:

$$CV_a = \sum_{i=1}^{t_e} n_i - \sum_{x=1}^{t_c} n_x \qquad \text{Eq. 3}$$

In Equation 3, $CV_a$ represents the circulating value of the account, $t_e$ represents the total number of virtual currency notes associated with the account, $n_i$ is the denomination (value) of a particular, electronically circulating currency note, $t_c$ represents the number of currency notes associated with the account 111 that are owned by the account custodian, and $n_x$ is the denomination (value) of a particular currency note owned by the custodian. As illustrated in Equation 3, the circulating value CVa is a difference between the sum of all of the virtual currency notes associated with an account or asset and a sum of the currency notes owned by the custodian thereof.

Combining Equations 2 and 3, the amount of electronically circulating currency associated with an asset or account may be expressed as:

$$r * V_a \geq \sum_{i=1}^{t_e} n_i - \sum_{x=1}^{t_c} n_x \qquad \text{Eq. 4}$$

Figure 4:
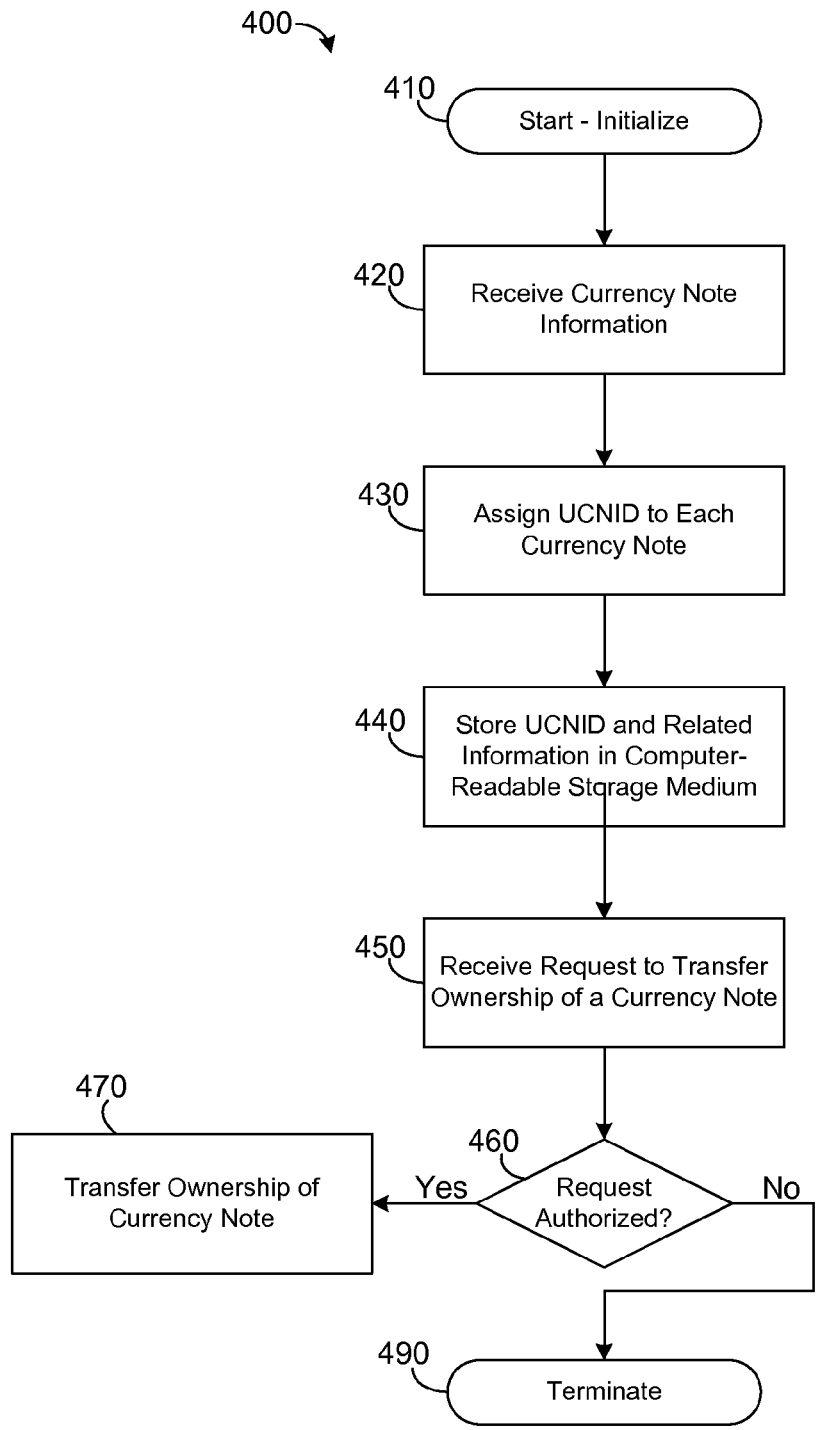
FIG. 4 is a flow diagram of one embodiment of a method for electronically circulating a currency.

As illustrated in FIG. 4, the circulating value of the virtual currency notes of an asset (the sum of the virtual currency notes associated with the asset minus a sum of the virtual currency notes owned by the asset custodian), may be maintained to be less than or equal to the value of the asset (account $V_a$) as scaled by a leverage factor r. The transaction provider 120 may be configured to enforce the relationship of Equation 4, which may comprise the transaction provider 120 preventing the custodian from withdrawing funds from the account 111, preventing devaluation of the account 111, prevent underinsurance of the account 111, prevent circulation of additional currency, or the like.

Although FIG. 1B is described in connection with an account 111 in a depository institution 110, the disclosure is not limited in this regard. Other types of assets may be used to back electronically circulating currency under the teachings of this disclosure including, but not limited to: physical assets, real property, intellectual property, bonds, stock, precious metals, options, and the like. The assets used to back electronically circulating currency may have a value, which may determine the total amount of electronically circulating currency that may be associated therewith (e.g., using Equations 1-4 as described above).

In some embodiments, the system 101 may include a transfer account 115. A transfer account 115 may be any financial account known in the art including, but not limited to: a checking account, a savings account, a depository account, or the like. The transfer account 115 may be owned by a particular user 130. The transfer account may be held by a financial institution 114, such as a bank, credit union, or the like and may (or may not) include a balance 117. A user 130 may own the account 115 and register it with the transaction provider, such that transaction provider 120 may transfer ownership of currency to/from the account 115. The account 115 may be identified by a public identifier, such as a URL.

When ownership of a currency note (virtual or otherwise) is transferred to the account 115, the transaction provider 120 may remove the transferred notes from electronic circulation and deposit the notes (or equivalent thereof) into the transfer account 115. If virtual currency notes are transferred, the transfer may be implemented by removing the virtual notes from circulation (e.g., updating the data structure 125 to indicate that the virtual currency notes can no longer be transferred), and depositing the transferred amount into the account 115 (e.g., from account 113 into the account 115). If actual currency notes are transferred, the data structure 126 may be updated to remove the currency notes from electronic circulation, the currency notes may be removed from the reserve 114, and the currency (of equivalent) may be transferred into the account 115. Alternatively, ownership of the transferred currency notes may pass to the transaction provider 120 (or another entity), and an equivalent amount of currency may be transferred to the account 115 (effectively increasing the amount of currency electronically circulated by the transaction provider 120).

When ownership of a currency note is transferred from the account 115 into the system, the transaction provider 120 may add the transferred notes (or equivalents thereof) to the pool of electronically circulating currency. If account-based, virtual currency notes are used (as in FIG. 1B), the transfer may comprise transferring the currency from the account 115 into the account 111, generating virtual currency notes in the data structure 126, and transferring ownership of the virtual currency notes to a user 130 (effectively increasing the amount of currency electronically circulated by the transaction provider 120). If an "actual" currency reserve is used (as in FIG. 1A), the transfer may comprise transferring the currency (or equivalent value) to the depository institution 110, the institution adding currency to the reserve 112, and transferring ownership of the currency notes 112 to a user 130.

In some embodiments, the systems 100 and 101 of FIGS. 1A and 1B may be combined, such that the transaction provider 120 electronically circulates a set of "actual" currency notes as well as a set of "virtual" currency notes.

FIG. 2B illustrates one example of a data structure for a virtual currency note. The data structure 201 may correspond to a virtual currency note to be circulated in association with a deposit account, such as the deposit account 111 of FIG. 1B.

The virtual currency note data structure 201 may include a unique currency identifier (UCNID). Unlike the UCNID described above in conjunction with FIG. 2A, which may be based on a serial number of a particular currency note, the UCNID 240 may be "virtual," in that it may not correspond to a serial number of an actual currency note. Rather, the UCNID 240 may be generated from a set of random data and/or from data configured to prevent an ID collision with an identifier generated from an "actual" currency note. In some embodiments, the UCNID of a "virtual" currency note may be indistinguishable (from the perspective of an end user) from that of a UCNID derived from an actual currency note. Alternatively, virtual UCNIDs may be readily distinguishable from UCNIDs tied to physical currency notes.

The virtual currency note data structure 201 may include a currency type field 242 and a denomination field 244. The currency type 242 may indicate type and/or issuer of the virtual currency note. The currency type 242 may be determined by the account to which the virtual currency note is tied. For example, if the account is in United States dollars, the currency type of virtual currency notes tied thereto may be United States dollars, currency tied to an account in Euros may have a type of Euro, and so on. In some embodiments, the currency type 242 of a virtual currency note 201 may differ from the currency type of the associated account. However, in this case, insurance or other provisions may be required to prevent the account from becoming undervalued as a result of changes in currency exchange rates (e.g., if virtual currency notes are in Euros and the associated account is in USD, changes in the relative valuation of Euros to USD may cause the value of the virtual currency notes to exceed the value of the associated account). The denomination field 244 may indicate a denomination of the virtual currency note 201. Since the currency note is "virtual" (e.g., not tied to a particular currency note, but rather an account), the denomination 244 need not be tied to actual denominations. Accordingly, a single virtual currency note may have a value of three dollars. However, in some embodiments, the denominations 244 of virtual currency notes 201 may be restricted to those available in the actual currency.

The account identifier field 246 may identify the account to which the virtual currency note 201 is tied. The account identifier may include the account number or other identifier associated with the account associated with the virtual currency note 201. The account holder identifier AHID 248 may identify which depository institution holds the account (e.g., identify the bank, credit union, or other entity that holds the account). As described above, the UCNID 240 may be derived from the currency type 242, the denomination 244, the account identifier 246, and/or the account holder identifier 248 to allow for detection of the modification thereof.

Ownership of a virtual currency note may be defined similarly to that of a physical currency note described above. For example, the UCNID 240 of the virtual currency note may be included in a data structure 200 (in field 210), an owner may be assigned (in field 212), and so on. The currency type 220, denomination 222, and other fields (e.g., 230) may be derived from the data structure 201.

Figure 3A:
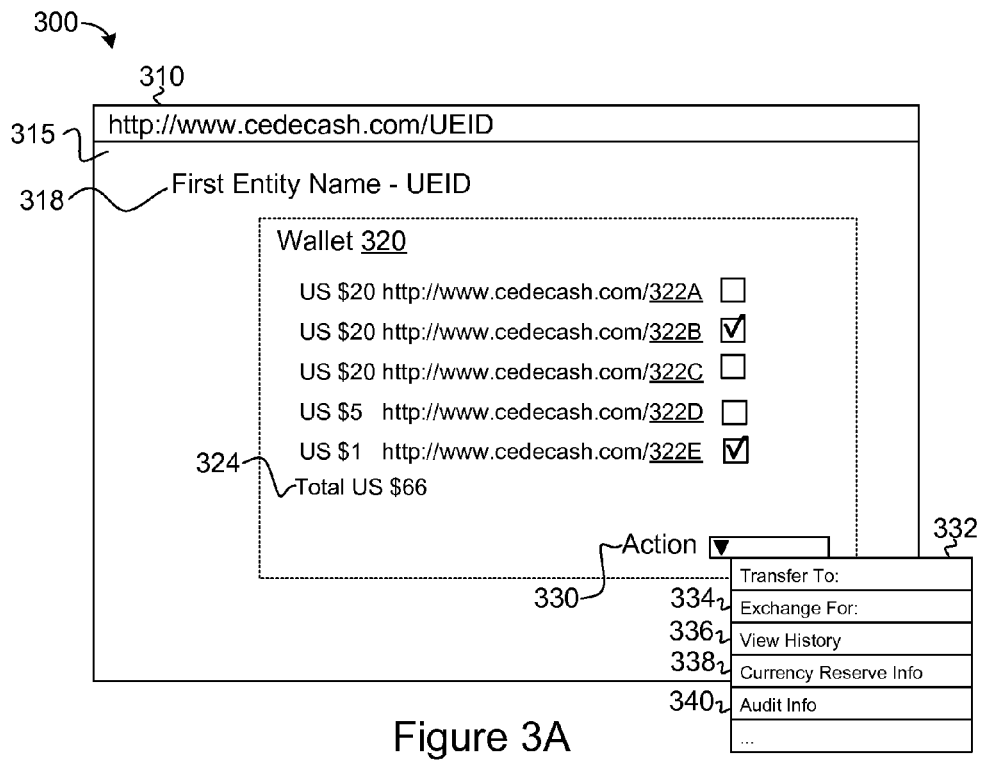
FIG. 3A depicts one embodiment of a transaction provider interface.

FIG. 3A shows one embodiment of an interface provided by the transaction provider 120. The interface 300 may comprise a web page 310 implemented using Hyper Text Markup Language (HTTP) adapted for display on a computing device (e.g., personal computer, cell phone, personal digital assistant (PDA), or the like) in a web browser application, such as Mozilla Firefox®, Microsoft Internet Explorer®, or the like. In some embodiments, access to the interface of a particular entity (e.g., the entity identified by the UEID 318) may be restricted to the entity and/or to those authorized by the entity. Access may be controlled via an authentication interface (not shown), whereby the entity may authenticate his/her identity directly to the transaction provider, such as the transaction provider 120 and/or to a third-party service 150 of FIGS. 1A and 1B (e.g., the transaction provider may be configured to accept an authentication credential verifying the identity of the entity from one or more of the third-party services 150).

The interface 300 may be adapted to display information 315 regarding a particular entity 318. The interface may include a listing (e.g., wallet 320) of currency notes 322A-322E owned by the entity 318. The wallet 320 may display the total 324 value of the entity's currency notes 322A-322E. Accordingly, access to the interface 300 may be restricted to the particular entity and/or to those authorized to access the interface 300 by the particular entity (e.g., access to the interface 300 may be controlled by an authentication step, which, as discussed above, may be implemented by a third-party service).

An action interface 330 may allow the user to electronically circulate the currency notes 322A-322E, while maintaining the currency notes in respective currency reserve(s). Additionally, the interface 330 may allow the user to withdraw currency notes from a currency reserve and/or account. The action interface 330 may perform a selected action (e.g., action 332-340) on one or more selected currency notes 322A-322E. As shown in FIG. 3A, currency notes 322A-322E may be selected using an interface component (e.g., FIG. 3A shows a checkbox interface component in which currency notes 322B and 322E are selected). However, the interface 300 could include any interface component and/or selection mechanism known in the art.

The transfer action 332 may cause a transfer request to be transmitted to the transaction service. Selection of the transfer action 332 may allow the user of the interface 300 to provide an identifier of the entity to which the selected currency notes are to be transferred (e.g., an email address, distinguished name, alias, or the like). In some embodiments, the interface 300 may provide a look-up mechanism, whereby an identifier of a particular entity may be found. The transfer action may transfer ownership of the selected currency notes to the specified entity (e.g., ownership of the currency notes 322B and 322E may be transferred to the specified entity).

The user access the interface 330 to withdraw currency notes from electronic circulation (e.g., transfer currency into another, non-electronically circulated account, such as a checking or savings account). In one embodiment, a user may establish an entity corresponding to transfer account (a "transfer entity"). The transfer account may correspond to any financial account known in the art, including a checking account, savings account, investment account, or the like. The transfer account may be assigned a public identifier (e.g., a URL). The transfer of ownership to a transfer entity (transfer to the public identifier of a transfer account) may cause the transaction provider to transfer the currency notes to (or transfer an equivalent amount of currency) into the identified transfer account. The ownership transfer to a transfer entity may effectively withdraw the currency from electronic circulation. Similarly, transferring currency from a transfer entity to another entity may cause currency notes to be entered into electronic circulation. In some embodiments, a transfer entity may be allowed to transfer non-managed currency into the system (e.g., from a checking account, deposit account, savings account, or the like). The transferred currency may be included (e.g., deposited) into an electronically circulated account (e.g., the account 111 of FIG. 1B). Once transferred into the electronically circulated account, one or more virtual currency notes may be derived therefrom, and ownership of the currency may be transferred to the identified entity as described above. A transfer entity may, therefore, act as a quick and easy way of transferring money into and out of electronic circulation.

In some embodiments, the transfer action 332 may be configured to allow the user to enter a currency amount to be transferred (e.g., eight (8) U.S. dollars). Responsive to this request, a transaction provider (or other service) may be configured to automatically exchange one or more currency notes for the user to thereby obtain currency in the proper denomination(s) to transfer the requested amount. For example, the transaction provider may automatically exchange a U.S. twenty (20) dollar currency note for a ten (10) dollar currency note, a five (5) dollar currency note, and five (5) one (1) dollar currency notes. From these exchanged notes, the transaction provider may transfer the five (5) dollar currency note and three (3) one (1) dollar currency notes to the specified entity. If a currency note in the desired denomination does not exist (e.g., a transfer or fifty cents ($0.50) is requested), the transaction provider may provide for a transfer of a partial interest in a currency note (e.g., transfer of one-half ownership in a one (1) dollar currency note). Similarly, an automatic exchange to another currency type (e.g., from U.S. dollars to Euros) may be made.

The exchange action 334 may allow the entity to exchange the selected currency notes for one or more other currency notes. As discussed above, the exchange may be made for currency notes of another denomination. For instance, currency notes of a first type (e.g., United States dollars) may be exchanged for currency notes of another type (e.g., Euros). Selection of the exchange action may allow the user to specify the denomination and/or currency type to exchange.

The view history action 336 may allow the entity to view the ownership history of one or more selected currency notes. The ownership history may provide a listing of the one or more entities that have had ownership of the currency notes (e.g., the currency notes 322B and 322E).

The currency reserve information action 338 may display information regarding the currency reserve that holds the selected currency notes (e.g., currency notes 322B and 322E). As discussed above, the currency reserve information may provide contact information regarding the currency reserve where the physical currency notes are held. In addition, an audit information action 340 may provide information regarding an audit of the selected currency notes. The audit information may include the last date the currency note(s) were verified to be at the currency reserve or the like.

Although not shown in FIG. 3A, the interface 300 could include additional actions, such as reserve transfer action to request a transfer of selected currency notes out of a currency reserve, a fund action, which may be used to add currency notes by transferring funds into a currency reserve, view a transaction history of one or more currency notes (e.g., view a record of the transactions in which ownership the currency note(s) were transferred), or the like. As described above, in some embodiments, transfers into/out of the currency reserve may be performed using a transfer account. A transfer of ownership of currency to a transfer account may cause the transferred currency notes (or equivalent thereof) to be withdrawn from electronic circulation and deposited into the transfer account. Transfers from a transfer account to a particular entity may cause the transferred currency notes (or equivalent thereof) to be included in a pool of electronically circulated currency. As discussed above, a transfer account identifier may be represented by a public URL As discussed above, each currency note may be assigned a UCNID, which, in some embodiments, may comprise a URL or URI. The currency notes listed in the wallet 320 each include respective URL identifiers 322A-322E. The URI/URL identifiers may be referenced on a network (e.g., the Internet). A transaction provider (or other service) may make information about a currency note accessible using the UCNID of the currency note (e.g., the URL or URI of the currency note). For example, submitting the UCNID to the transaction provider (or other service) may cause an interface 301 to be displayed.

Figure 3B:
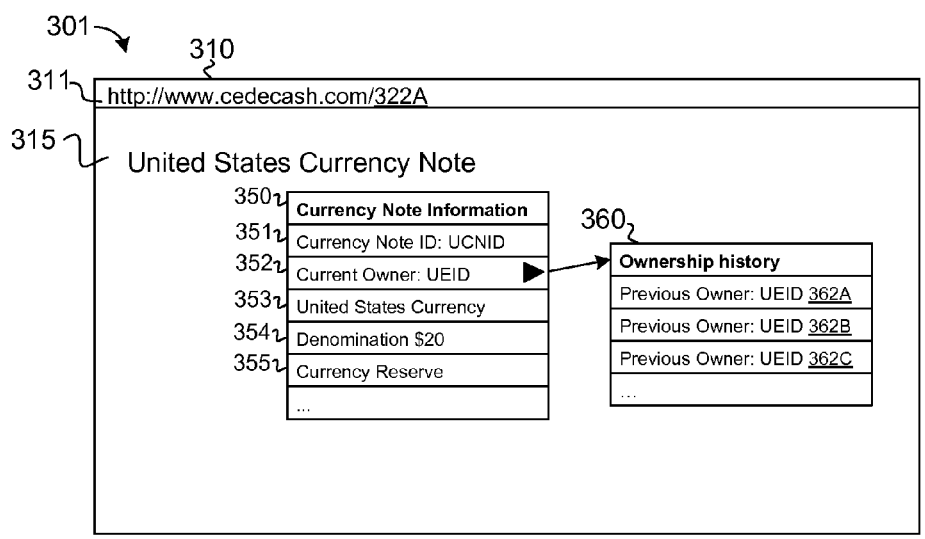
FIG. 3B depicts one embodiment of another transaction provider interface.

FIG. 3B is an example of an interface 301 adapted to display information about an electronically circulated currency note. The interface 301 may be available from a transaction provider (or other service) through the URL or URI of the currency note 311. In the FIG. 3B example, the interface 301 displays information regarding currency note 322A. (The UCNID 322A has been entered into the address field of the browser application 310.)

The information display 315 provides currency note information 350, which may include, but is not limited to: a display of the currency note identifier 351, a display of the current owner of the currency note 352, a display of the currency type 353 (e.g., United States dollars, Euros, etc.), a denomination indicator 354, and/or information regarding the currency reserve 355 that holds the physical currency note.

The ownership information 352 may provide a display of an ownership history of the currency note 360. The ownership history may include a listing of the previous owners 362A-362C of the currency note 322A. Although not shown in FIG. 3B, additional information, such as references to transactions in which ownership of the currency note was transferred, may be provided on the interface 301.

As discussed above, the currency reserve information 355 may provide a link to additional information relating to the currency reserve holding the currency note. Such information may include, but is not limited to: an address of the currency reserve, contact information for the currency reserve, insurance status of the currency reserve (e.g., indicators as to whether the currency reserve is protected by the FDIC or some other organization), an audit status of the currency reserve (e.g., the date of the last currency audit at the currency reserve), and so on.

Figure 3C:
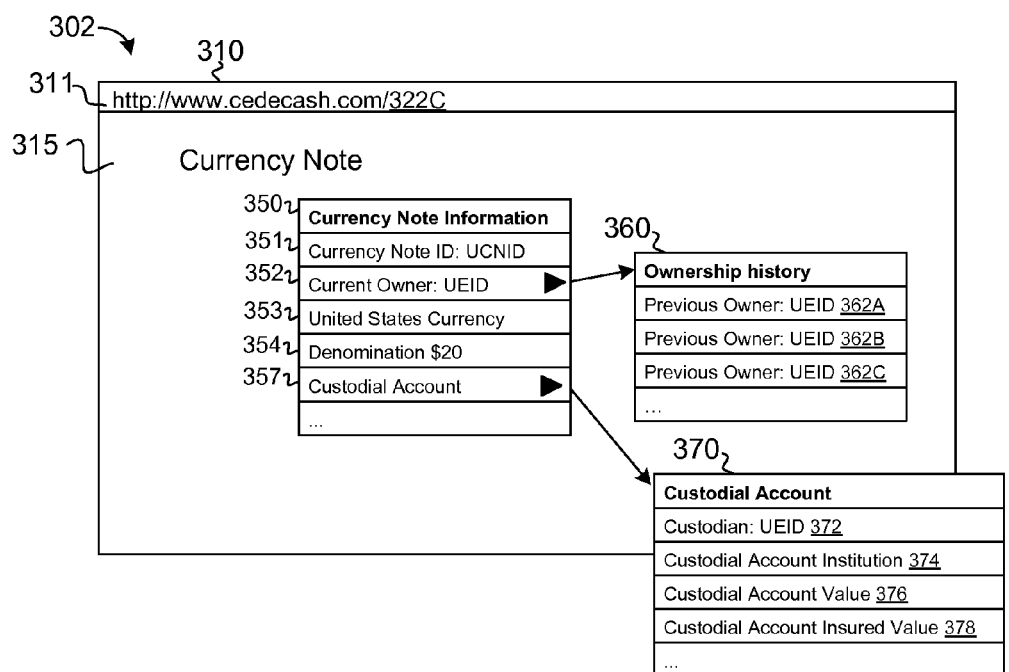
FIG. 3C depicts one embodiment of another transaction provider interface.

FIG. 3C is an example of an interface 302 adapted to display information about an electronically circulated currency note associated with a custodial account, such as the account 111 of FIG. 1B. The electronically circulated currency note may be identified by a URL 322A, which may allow a transaction provider to uniquely identify the currency note within a pool of circulating currency notes. The URL 322A may be accessible on a network (e.g., the Internet), to allow potential transacting entities to view and/or verify the ownership status of a particular, electronically circulated currency note. As described above, the currency note displayed in the interface 302 may be associated with a UCNID 322A, which may be embodied as a URL.

Like the interface 301 described above, the interface 302 may include information about a currency note 350, including, but not limited to: the currency note identifier 351, currency owner identifier 352, currency type indicator 353, denomination indicator 354, and the like.

The interface 302 may further include a custodial account identifier 357, which may indicate that the electronically circulated currency note is not associated with a physical piece of currency, but instead is tied to a custodial account, such as the custodial account 111 of FIG. 1B (e.g., the currency note is a "virtual" currency note, as opposed to a currency note derived directly from a physical currency note). The indicator 357 may provide for displaying additional information 370 about the custodial account associated with the currency note.

The custodial account display 370 may include an identifier 372 of the custodian who holds the account to which the currency note is tied. The identifier 372 may be used to reference and/or access information about the account custodian. A custodial account institution indicator 374 may provide an identifier of the institution that holds the account. The institution may be a bank, a credit union, an investment account holder, or the like. The identifier 376 may be used to reference and/or access additional information about the holder, such as the holder's address, financial statements, contact information, and the like. An indicator of the custodial account value 376 may be provided. The account value 376 may indicate the current value of the custodial account. As described above, the electronic circulation system (e.g., transaction provider) may require that the value of the custodial account be maintained at some value greater than the value of the circulating currency associated therewith. The custodial account value may also provide an indication of the value of the currency notes associated with the account (minus the currency notes that are owned by the custodian of the account per Equation 1 above). As described above, the transaction provider (or other electronic currency circulation provider) may require that the value of the circulating currency notes associated with the custodial account be less than or equal to the value of the custodial account. An indicator 378 may provide an indication of an insured value of the custodial account. As described above, in some embodiments, a transaction provider may require that custodial accounts be insured. The value of the insurance may be related to the value of the electronically circulating currency notes (insured for the full value of the electronically circulating currency notes, a fraction of the value, or the like).

Figure 3D:
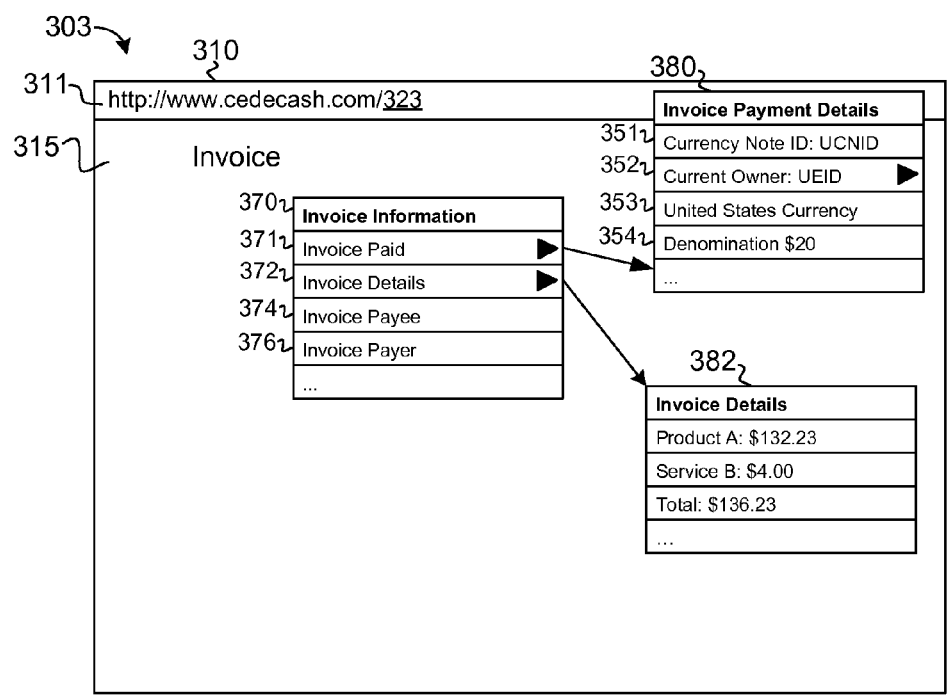
FIG. 3D depicts one embodiment of another transaction provider interface.

FIG. 3D depicts one embodiment of an interface 303 adapted to display information regarding an invoice (e.g., data structure 202 of FIG. 2C). As discussed above, an invoice may be associated with and/or assigned a unique invoice identifier (UIID), which may be embodied as and/or be associated with a URL 311 to allow the invoice to be referenced within a network, such as the Internet for display in a browser application 310. The display area 315 of the interface 303 may include an invoice information display 370. The display 370 may provide an indicator 371 of whether the invoice has been paid (whether currency notes in the amount specified in the invoice have been transferred thereto). If the invoice has been paid, the indicator 371 may display "paid," or "fulfilled." Alternatively, or in addition, the indicator 371 may provide links to the currency notes used to pay the invoice. Information regarding the one or more currency notes may be displayed in a display 380 as described above in conjunction with FIGS. 3B and/or 3C (may include a UCID display 351, currency owner indicator 352, currency type indicator 353, currency denomination indicator 354, and so on).

The display 370 may further include invoice details 372, which, as discussed above, may provide details regarding a product or service associated with the invoice (e.g., provide a link to an auction, identify a product or service, and so on). The invoice details may further include an invoice display 382, which may provide additional detail regarding the invoice, such as an itemized listing of products in the invoice, terms or service, fulfillment details (e.g., tracking number for a product shipped to the payer), and so on.

The display 370 may also include indications of the invoice payee 374 and the invoice payer 376. As discussed above, the payee 374 may be the entity who received ownership of the currency notes used to pay the invoice. The payer 376 may be entity to transferred currency notes to pay the invoice. In some embodiments, the invoice payee indicator 374 and/or the invoice payer indicator 376 may be omitted from the display 370 (e.g., the invoice payee and/or payer may remain anonymous).

FIG. 4 is a flow diagram of one embodiment of a method for electronically circulating a currency. The method 400 may be implemented using one or more computer-readable instructions stored on a computer-readable storage medium. The instructions may be embodied as one or more distinct software modules on the computer-readable storage medium. In addition, one or more of the steps of the method 400 may be implemented using hardware components. Therefore, portions of the method 400 may be tied to particular machine components.

At step 410, the method 400 may be initialized, which may comprise loading computer-readable instructions from a computer-readable storage medium, accessing one or more hardware components (e.g., communications interfaces, computer-readable data storage medium, and the like).

At step 420, the method 400 may receive information regarding a set of currency notes. The currency notes may be disposed in one or more currency repositories and may be dedicated for use in the electronic currency circulation method 400. The information may include, but is not limited to: the currency note type, currency note denomination, currency note serial number, a currency owner of the currency note, information regarding the currency repository of the note, and the like. Alternatively, the information may comprise information relating to an account, such as the account 111 of FIG. 1B. The information may include the currency type in the account, a base value of the account (e.g., a minimum insured value, etc.), account holder information, and the like.

At step 430, a UCNID for each of the currency notes may be determined. In the method 400 example, the UCNID may be derived from the serial number of the currency notes and may be embodied as a URI. Alternatively, if the currency is held in an account, a plurality of virtual currency identifiers may be generated. The virtual currency notes may be generated in any number of different denominations, total of which may sum to the value of the identified account.

At step 440, the method 400 may record the currency note identifiers in a computer-readable storage medium (e.g., in a data structure, such as the data structures 200 or 201 described in conjunction with FIGS. 2A and 2B). In addition, at step 440, the currency notes may be associated with respective owners. The owners may be one or more entities, the method 400, the currency reserve, or the like. The association may be made in the computer-readable storage medium.

At step 450, a request to transfer a currency note from a first entity to a second entity may be received. The request may identify the transferor (the first entity) using a UEID of the first entity, may identify the transferee (the second entity) using a UEID and/or alias of the second entity, and may identify the currency note to transfer using the UCNID of the note.

At step 460, the request may be authorized. Authorizing the request may comprise verifying that the request was submitted by the first entity and/or authorized by the first entity, verifying that the request was not tampered with in transit, and/or verifying that the first entity is the owner of the currency note to be transferred. If the request is authorized, the flow may continue to step 470; otherwise, the flow may terminate at step 490.

At step 470, ownership of the currency note may be transferred to the second entity. Transferring ownership may comprise associating the second entity (e.g., a UEID of the second entity) with the currency note in the computer-readable storage medium (e.g., in the data structure 200 of FIG. 2). In addition, a UEID of the first entity may be added to a list of previous owners of the currency note. The transfer may occur while maintaining the physical currency note in the currency reserve. If the transfer involves a "virtual" currency note, the transfer may occur without modifying the contents of the account tied to the currency note (e.g., without withdrawing and/or transferring value into or out of the account).

At step 470, the transfer may be to a "transfer entity," which may correspond to a deposit account. As described above, the transfer to a transfer entity may cause the currency to be removed from electronic circulation and transferred into the account referenced by the transfer entity. As discussed above, the transfer may be made using "virtual" currency notes, or currency notes tied to actual currency notes. If the source of the transfer is a transfer entity, currency notes may be added into electronic circulation as described above.

In some embodiments, the transfer of step 470 may include a transfer to an invoice. The ownership transfer of step 470 may be made to the entity identified as the payee under the invoice (e.g., in a UEID field of the invoice, field 256 in FIG. 2C). In addition, a payment field of the invoice may be updated to reflect that the invoice has been paid and/or to identify the currency notes (e.g., by UCNID) used to pay the invoice.

At step 490, the flow may terminate.

Figure 5A:
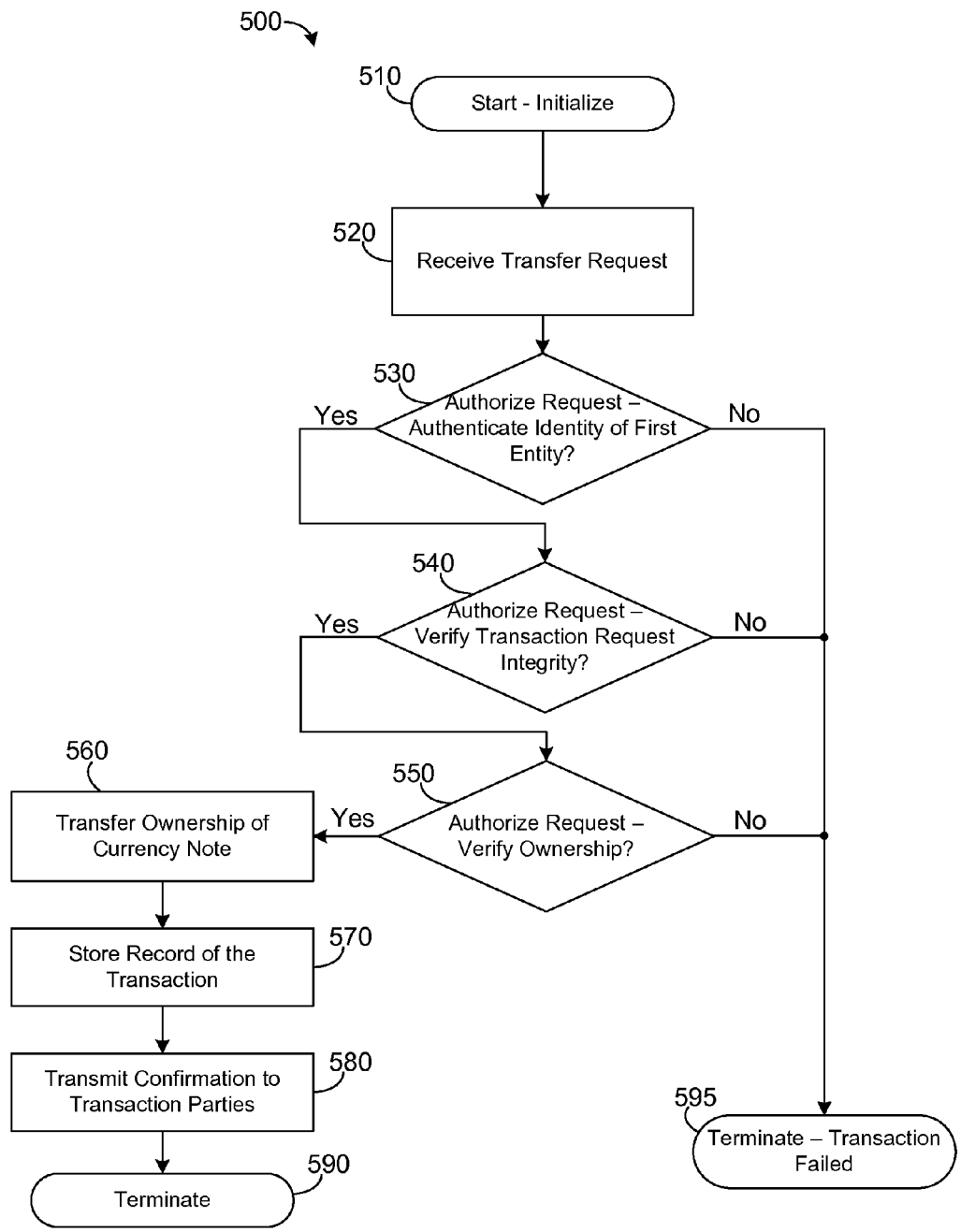
FIG. 5A is a flow diagram of another embodiment of a method for electronically circulating a currency.

FIG. 5A is a flow diagram of another embodiment of a method 500 for electronically circulating a currency. The method 500 may be implemented using one or more computer-readable instructions stored on a computer-readable storage medium. The instructions may be embodied as one or more distinct software modules on the computer-readable storage medium. In addition, one or more of the steps of the method 500 may be implemented using hardware components. Therefore, portions of the method 500 may be tied to particular machine components.

At step 510, the method 500 may be initialized as described above.

At step 520, a request to transfer a currency note from a first entity to a second entity may be received. The request may be transmitted by and/or authorized by a first entity, may identify one or more currency notes to be transferred (e.g., by UCNID of the currency notes), and may identity a transferee (e.g., the second entity) using a UEID of the second entity and/or an alias of the second entity.

At step 530, the method 500 may authorize the request. Authorizing the request at step 530 may comprise determining whether the first entity transmitted the request and/or whether the first entity authorized the request to be transmitted. Step 530 may comprise receiving from the first entity a credential to authenticate the identity of the first entity. Alternatively, or in addition, step 530 may comprise receiving a credential authenticating the first entity from a third-party service (e.g., an authentication provider, such as an OpenID® provider). The credential may authenticate a session of the first entity with the method 500. Alternatively, or in addition, the credential may be attached to the request itself (e.g., as an HTTP AUTH header, a digital signature, or the like). If the method 500 authenticates the identity of the first entity and/or determines that the first entity authorized the request, the flow may continue at step 540; otherwise, the flow may terminate at step 595.

At step 540, the request may be further authorized, which may comprise verifying that the request has not been tampered with in transit. In some embodiments, the verification of step 540 may be performed by the communications channel used to transmit the request. For example, if the request was received over a secure communications protocol (e.g., SSL, or the like), the method 500 may verify that the request was not tampered with and/or modified in transit. Alternatively, or in addition, the request may include a signature or other data that may be used to verify the request. If the request is further authorized (e.g., verified to be free from tampering), the flow may continue at step 550; otherwise, the flow may terminate at step 595.

At step 550, the request may be further authorized, which may comprise verifying that the first entity (the transferor) is the owner of the currency note(s) to be transferred. As discussed above, ownership may be determined by accessing ownership information associated with the currency notes in a data structure (e.g., by comparing an identifier of the first entity to the ownership information of the currency notes). If the first entity is the owner of the identified currency notes, the flow may continue to step 560; otherwise, the flow may terminate at step 595.

At step 560, the method 500 may transfer ownership of the currency note(s) to the second entity. Transferring ownership may comprise associating a UCNID of the currency notes with the UEID of the second entity and/or an alias of the second entity in a data structure stored on a computer-readable storage medium, such as the data structure 200 of FIG. 2A. In addition, if the method 500 is configured to maintain a record of the ownership history of currency notes, the first entity may be added to a list of previous owners of the transferred currency note(s). As described above, the transfer of step 560 may include transfer to/from a transfer account, which may involve adding and/or removing currency notes from electronic circulation.

At step 570, a record of the transaction may be recorded. The record may be made on a computer-readable storage medium and/or on a tangible medium, such as a paper receipt. The record may be maintained by the method 500 and/or may be made available to the first entity and/or the second entity (e.g., via a user interface, by mail, or the like).

At step 580, the method 500 may transmit a confirmation message to the first entity and/or the second entity. The confirmation message may include the details of the transfer, such as the currency notes transferred, the date and/or time of the transfer, and the like. The confirmation message may be authenticated by the method 500 (e.g., using a digital signature or the like) to allow a recipient of the message to verify the authenticity or the message and/or to verify that the message has not been tampered with.

At step 590, the method 500 may terminate.

At step 595, the method may terminate without performing the transfer. In some embodiments, step 595 may include the method 500 recording a record of the failed transaction. The record may specify the reason(s) the transaction was aborted (e.g., failure to authenticate the request, first entity not the owner of the currency, etc.). The record may be recorded on a computer-readable storage medium and/or on a tangible medium (e.g., a paper receipt). Alternatively, or in addition, the record may be transmitted to one or more of the parties to the aborted transaction (e.g., first entity, the second entity, and/or a currency reserve holding the currency note(s)).

Figure 5B:
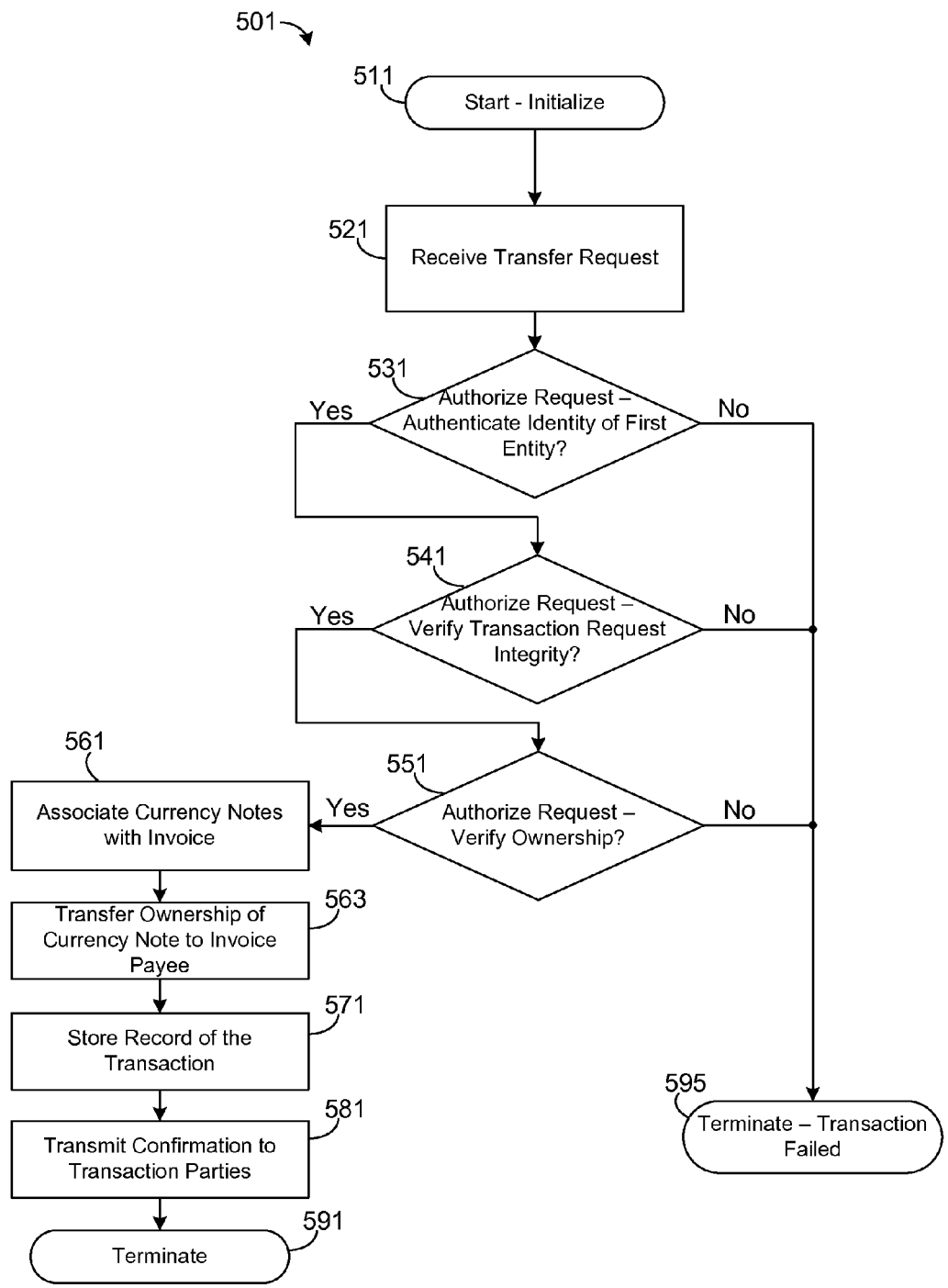
FIG. 5B is a flow diagram of another embodiment of a method for electronically circulating a currency.

FIG. 5B is a flow diagram of one embodiment of a method 501 for transferring currency notes to an entity using an invoice. The method 500 may be implemented using one or more computer-readable instructions stored on a computer-readable storage medium. The instructions may be embodied as one or more distinct software modules on the computer-readable storage medium. In addition, one or more of the steps of the method 501 may be implemented using hardware components. Therefore, portions of the method 501 may be tied to particular machine components.

At step 511, the method 501 may be initialized as described above.

At step 521, a request to transfer a currency note from a first entity to an invoice may be received. The request may be transmitted by and/or authorized by a first entity, may identify one or more currency notes to be transferred (e.g., by UCNID of the currency notes), and may identity an invoice to which the notes are to be transferred using a UIID and/or an alias thereof.

At steps 531, 541, and 553, the information in the transfer request may be authenticated, transaction request integrity may be verified, and the ownership of the currency notes may be verified as described above. If any of the steps 531, 541, and/or 553 fails, the flow may terminate at step 597 as described above.

At step 561, the currency notes identified in the transaction request received at step 521 may be associated with the invoice. The association of step 561 may comprise setting a payment field of an invoice data structure to the UCNIDs of the currency notes. The association may allow the invoice payer, invoice payee, and/or other entities, to view invoice payment details (e.g., verify that the invoice was paid, show which currency notes were used to pay the invoice, and so on).

At step 563, ownership of the currency notes associated with the invoice may be transferred to entity identified as the payee under the invoice (e.g., the UEID of an invoice payee field). The ownership transfer make take place as described above.

At steps 571, 581, and 591, a record of the transaction may be stored, confirmation may be transmitted, and the method 501 may terminate as described above.

Although the flow diagrams of FIGS. 4, 5A, and 5B describe a transaction to transfer ownership of electronically circulated currency note(s), the methods could be adapted to perform any other electronic currency circulation task including, but not limited to: exchanging a first set of currency notes for a second set of currency notes (e.g., currency notes of another denomination, issued by another entity or state, and so on), viewing the ownership status of a currency note, viewing the ownership history of a currency note, viewing currency reserve information of a currency note, accessing audit information of a currency note, purchasing currency notes, redeeming currency notes, and so on. Therefore, the flow diagrams of FIGS. 4 and 5 should not be read as limited to any particular set of currency circulation functions.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. A system for electronically circulating a currency, comprising:
   a server computing device communicatively coupled to a network and comprising a memory, processor and a computer-readable storage medium, the server computing device comprising:
     a transaction provider resident on the computer-readable storage medium of the server computing device and in communication with a deposit institution holding an asset having a value via the network, the transaction provider configured to generate in the computer-readable storage medium a plurality of virtual currency notes, wherein each virtual currency note is assigned a respective unique currency identifier (UCNID) and has a respective value, wherein a sum of the values of the virtual currency notes does not exceed the value of the asset,
     wherein the transaction provider is configured to assign ownership of virtual currency notes to respective owners by binding UCNIDs of virtual currency notes to respective unique entity identifiers (UEIDs), including binding a selected one of the plurality of the virtual currency notes to a UEID of a first entity,
     and wherein the transaction provider is further configured to provide for transferring ownership of the selected virtual currency note from the first entity to a second entity while maintaining the asset in the deposit institution in response to a transfer request received at the server computing device via the network, wherein the selected virtual currency note retains the particular UCNID after being transferred to the second entity, wherein the selected virtual currency note is transferrable by the second entity, and wherein transferring ownership comprises verifying that the UEID of the first entity is bound to the UCNID of the selected virtual currency note.

2. The system of claim 1, wherein the asset is one of a deposit account, an investment account, a money market account, and a mutual fund account.

3. The system of claim 1, wherein the asset has an insured value, and wherein the sum of the values of the virtual currency notes does not exceed the insured value of the asset.

4. The system of claim 1, wherein the asset is held by a custodian, and wherein the transaction provider is configured to maintain a circulating value of the virtual currency notes to be less than or equal to the value of the asset, and wherein the circulating value of the currency notes comprises a difference of a sum of the virtual currency notes of the asset and a sum of virtual currency notes owned by the custodian.

5. The system of claim 4, wherein the asset is held by a custodian, and wherein the transaction provider is configured to maintain the circulating value of the virtual currency notes to be less than or equal to the value of the asset as scaled by a scaling factor.

6. The system of claim 5, wherein the scaling factor is less than one.

7. The system of claim 1, wherein transferring the selected virtual currency note to the second entity comprises binding the UCNID of the selected virtual currency note to a UEID of the second entity.

8. The system of claim 1, wherein ownership of the selected virtual currency note is transferred from the first entity to the second entity responsive to the transaction provider receiving a transfer request, and wherein the transaction provider is configured to authorize the transfer request and to transfer ownership of the selected virtual currency note from the first entity to the second entity if the transaction request is authorized.

9. The system of claim 8, wherein authorizing the transaction request comprises the transaction provider verifying that the first entity is the owner of the selected virtual currency note by comparing the UEID associated with the UCNID of the selected virtual currency note in the computer-readable storage medium to the UEID of the first entity.

10. The system of claim 1, wherein a UEID comprises one of an email address, a uniform resource identifier (URI), a uniform resource locator (URL), a uniform resource name (URN), and a distinguished name (DN), and wherein a UCNID comprises one of a URI, a URL, a URN, and a DN.

11. The system of claim 1, wherein the second entity is associated with a financial account, and wherein transferring ownership of the selected virtual currency note to the second entity comprises transferring an equivalent value of the selected virtual currency note into the financial account.

12. The system of claim 1, wherein the transaction provider is configured to provide an invoice specifying a payee, and wherein when an entity transfers ownership of the selected virtual currency note to the invoice, the transaction provider is configured to associate the selected currency note with the invoice and to transfer ownership of the selected currency note to the payee specified in the invoice.

13. A non-transitory computer-readable storage medium comprising instructions to cause a computing device comprising a processor and memory to perform a method for electronically circulating a currency, the method comprising:
   generating, at a server computing device computing a memory and a processor, a plurality of virtual currency notes, each virtual currency note having a respective unique currency note identifier (UCNID) and being associated with a currency denomination, wherein each virtual currency note is associated with an asset having a value;

assigning ownership of virtual currency notes by associating the virtual currency notes with respective owners of the virtual currency notes in a database, including assigning ownership of a selected one of the plurality of virtual currency notes to a first one of a plurality of entities by associating the UCNID of the selected virtual currency note with the first entity; and transferring ownership of the selected virtual currency note from the first entity to a second one of the plurality of entities in response to a transfer request received at the server computing device, wherein ownership of the selected virtual currency note is transferred by associating the UCNID of the selected virtual currency note with the second entity, wherein the virtual currency note is transferrable by the second entity, wherein the virtual currency note retains the same UCNID, and wherein transferring ownership comprises verifying that the first entity owns the selected virtual currency note by determining that the UCNID of the virtual currency note is associated with the first entity in the database.

14. The non-transitory computer-readable storage medium of claim 13, wherein the selected virtual currency note is associated with a first asset, and wherein a sum of the virtual currency notes associated with the first asset does not exceed a value of the first asset.

15. The non-transitory computer-readable storage medium of claim 13, wherein the selected virtual currency note is associated with a first asset, and wherein a circulating value of the first asset is less than or equal to a value of the first asset, and wherein the circulating value of the first asset comprises a sum of one or more virtual currency notes associated with the first asset less a sum of one or more virtual currency notes associated with the first asset and owned by a custodian of the first asset.

16. The non-transitory computer-readable storage medium of claim 13, wherein the selected virtual currency note is associated with a particular currency note deposited in a depository institution, wherein the denomination of the selected virtual currency note is the same as a denomination of the particular currency note, and wherein ownership of the selected virtual currency note is transferred while maintaining the particular currency note in the depository institution.

17. The non-transitory computer-readable storage medium of claim 13, wherein the second entity is associated with a financial account, and wherein transferring ownership of the selected virtual currency note to the second entity comprises depositing an equivalent of the virtual currency note into the financial account.

18. The non-transitory computer-readable storage medium of claim 17, where transferring ownership of the selected virtual currency note to the second entity further comprises associating the selected virtual currency note with another one of the plurality of entities.

19. The non-transitory computer-readable storage medium of claim 17, wherein transferring ownership of the selected virtual currency note to the second entity further comprises removing the selected virtual currency note from electronic circulation.

20. The non-transitory computer-readable storage medium of claim 13, the method further comprising maintaining an invoice specifying the second entity as a payee thereof, wherein transferring ownership of the selected virtual currency note comprises associating the selected virtual currency note with the invoice and transferring ownership of the virtual currency note to the payee specified in the invoice.

21. A method for electronically circulating a currency, comprising:

generating a plurality of virtual currency notes within a computer readable storage medium using a processor of a server computing device, each virtual currency note having a unique currency note identifier (UCNID), being assigned a currency denomination, and being associated with an asset held by a custodian;

using the processor of the server computing device to assign ownership of virtual currency notes by associating UCNIDs of the virtual currency notes with respective entities in the computer-readable storage medium, including associating a selected one of the plurality of virtual currency notes with a first entity;

receiving a request to transfer ownership of the selected virtual currency note from the first entity to a second entity at the server computing device in response to a transfer request received via a network from a remote, client computing device;

using the processor of the server computing device to verify that the first entity owns the selected virtual currency note by use of the associations between virtual currency notes and entities in the computer-readable storage medium; and in response to verifying that the first entity owns the selected virtual currency note, using the processor to transfer ownership of the virtual currency note to the second entity by associating, in the computer-readable storage medium, the UCNID with the second entity, wherein the transferred virtual currency note is transferrable by the second entity, and wherein the UCNID of the selected virtual currency note is unchanged after ownership is transferred to the second entity.

22. The method of claim 21, wherein the asset associated with the selected virtual currency note is a currency note.

23. The method of claim 21, wherein a sum of a plurality of virtual currency notes associated with a particular asset does not exceed a value of the particular asset.

24. The method of claim 23, wherein a particular asset has an insured value, and wherein a sum of the plurality virtual currency notes associated with the particular asset does not exceed the insured value.

25. The method of claim 21, further comprising:

determining a circulating value of a particular asset associated with a plurality of virtual currency notes, wherein the circulating value comprises a sum of the plurality of virtual currency notes less a sum of virtual currency notes associated with the particular asset that are owned by a custodian of the particular asset; and maintaining the circulating value of the particular asset less than or equal to a value of the particular asset.

26. The method of claim 21, wherein the asset is a deposit account.

27. The method of claim 26, wherein the second entity is associated with a financial account, and wherein transferring ownership of the selected virtual currency note comprises transferring an equivalent of the denomination of the virtual currency note into the financial account.

28. The method of claim 27, further comprising associating the selected virtual currency note with a third one of the plurality of entities.

29. The method of claim 28, further comprising removing the selected virtual currency note from electronic circulation.

* * * * *